US012656145B2

(12) United States Patent
Suzuki et al.

(10) Patent No.: US 12,656,145 B2
(45) Date of Patent: Jun. 16, 2026

(54) MAP GENERATION DEVICE, MAP GENERATION METHOD AND STORAGE MEDIUM

(71) Applicant: DENSO CORPORATION, Kariya-city (JP)

(72) Inventors: Taiki Suzuki, Kariya-city (JP); Satoshi Horihata, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/525,671

(22) Filed: Nov. 30, 2023

(65) Prior Publication Data

US 2024/0094025 A1 Mar. 21, 2024

Related U.S. Application Data

(63) Continuation of application No. PCT/JP2022/019681, filed on May 9, 2022.

(30) Foreign Application Priority Data

Jun. 3, 2021 (JP) ................................. 2021-093642

(51) Int. Cl.
*G01C 21/00* (2006.01)
*G06T 5/70* (2024.01)

(52) U.S. Cl.
CPC ..... *G01C 21/3815* (2020.08); *G01C 21/3885* (2020.08); *G06T 5/70* (2024.01)

(58) Field of Classification Search
CPC ............ G01C 21/3815; G01C 21/3885; G01C 21/3822; G06T 5/70; G09B 29/00
See application file for complete search history.

(56) References Cited

U.S. PATENT DOCUMENTS

| | | | |
|---|---|---|---|
| 2018/0148052 A1 | 5/2018 | Suto et al. | |
| 2020/0082724 A1 | 3/2020 | Oguro et al. | |
| 2020/0278684 A1* | 9/2020 | Naserian | G05D 1/0221 |
| 2021/0070303 A1* | 3/2021 | Yu | B60W 10/20 |

FOREIGN PATENT DOCUMENTS

| | | | |
|---|---|---|---|
| JP | 2019132988 A | * | 8/2019 |
| WO | 2017/047261 A1 | | 3/2017 |
| WO | 2018/087763 | | 5/2018 |

OTHER PUBLICATIONS

Machine Translated JP-2019132988-A (Year: 2019).*

* cited by examiner

*Primary Examiner* — Anne Marie Antonucci
*Assistant Examiner* — Misa H Nguyen
(74) *Attorney, Agent, or Firm* — Precision Patents, P.C.

(57) ABSTRACT

A server includes: a generating target location setting unit setting, as a target location for generating a virtual marking line, a region where a lane center line exists and part of a marking line does not exist; an origin point setting unit setting an origin point on the lane center line; a start point setting unit setting a start point on a marking line parallel to the lane center line, with the start point positioned forward or rearward relative to the origin point; an end point setting unit setting an end point on the marking line, with the end point being set in the other one of the forward position and rearward position relative to the origin point; a virtual marking line generating unit generating a virtual marking line by connecting the start end points; and a marking line connecting unit connecting the marking line and the virtual marking line.

12 Claims, 25 Drawing Sheets

LANE CENTER LINE

LANE CENTER LINE

LANE CENTER LINE

VEHICLE TRAVEL
DIRECTION

FIG.8

LANE CENTER LINE

LANE CENTER LINE

LANE CENTER LINE

VEHICLE TRAVEL DIRECTION

ORIGIN POINT o21

FIG.9

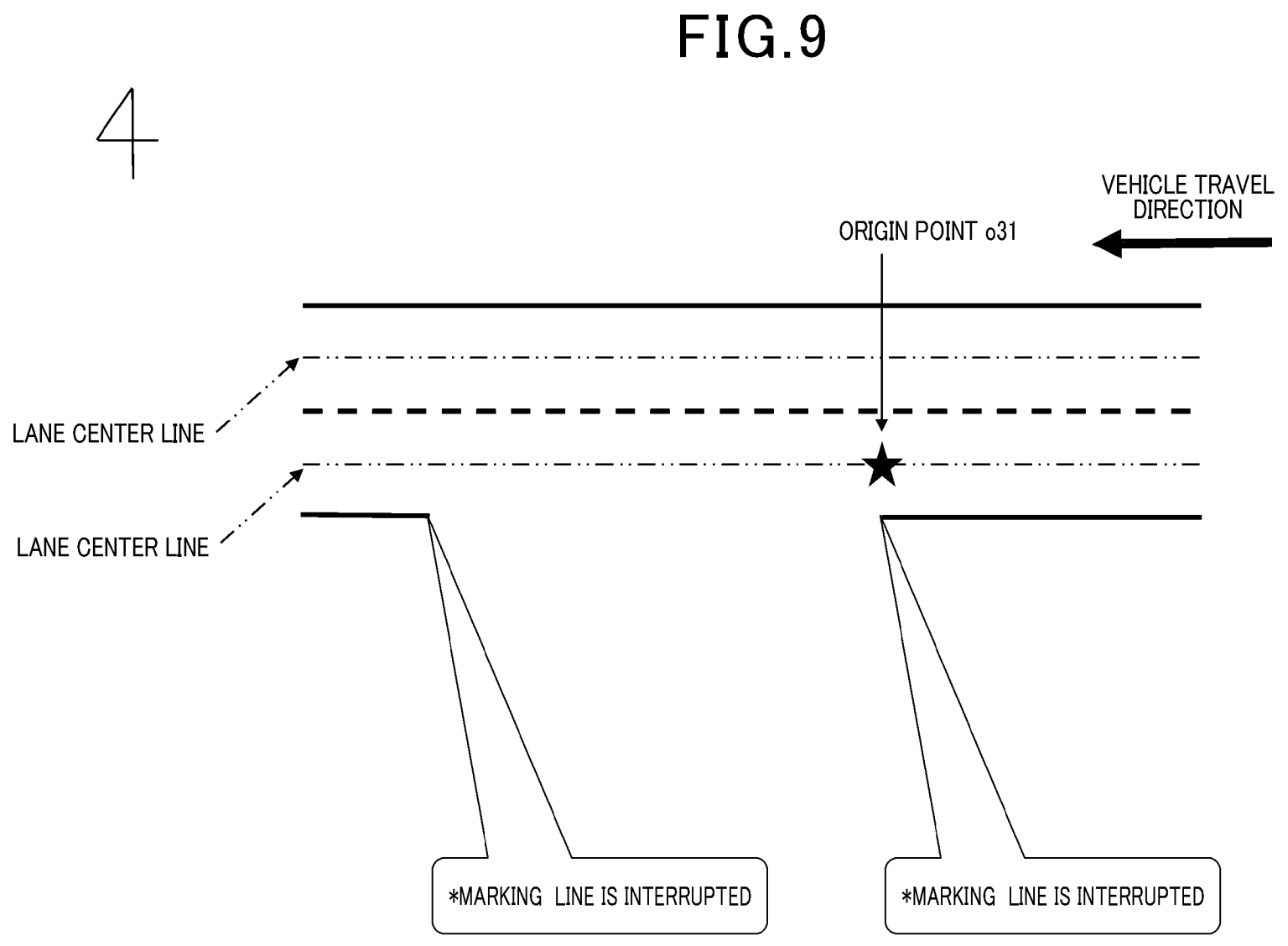

VEHICLE TRAVEL DIRECTION

ORIGIN POINT o31

*MARKING LINE IS INTERRUPTED

*MARKING LINE IS INTERRUPTED

LANE CENTER LINE

LANE CENTER LINE

FIG.18

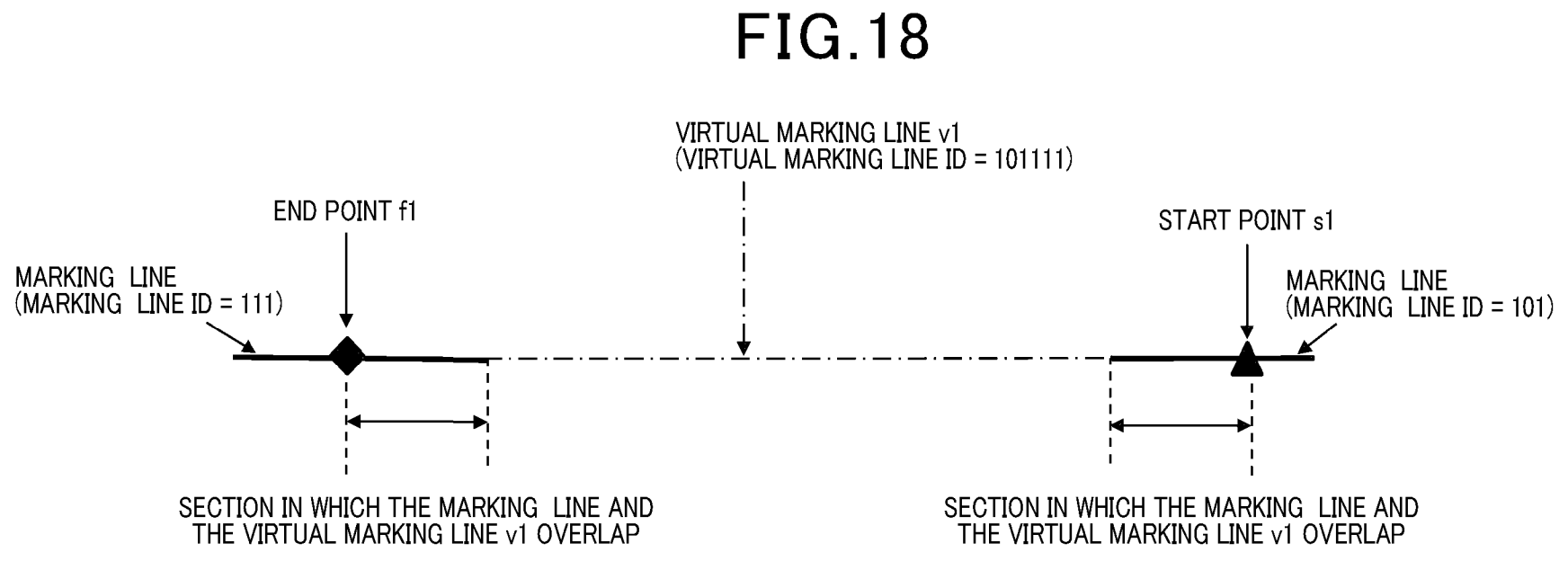

VIRTUAL MARKING LINE v1
(VIRTUAL MARKING LINE ID = 101111)

START POINT s1

MARKING LINE
(MARKING LINE ID = 101)

SECTION IN WHICH THE MARKING LINE AND
THE VIRTUAL MARKING LINE v1 OVERLAP

END POINT f1

MARKING LINE
(MARKING LINE ID = 111)

SECTION IN WHICH THE MARKING LINE AND
THE VIRTUAL MARKING LINE v1 OVERLAP

FIG.21   VIRTUAL MARKING LINE GENERATION PROCESS

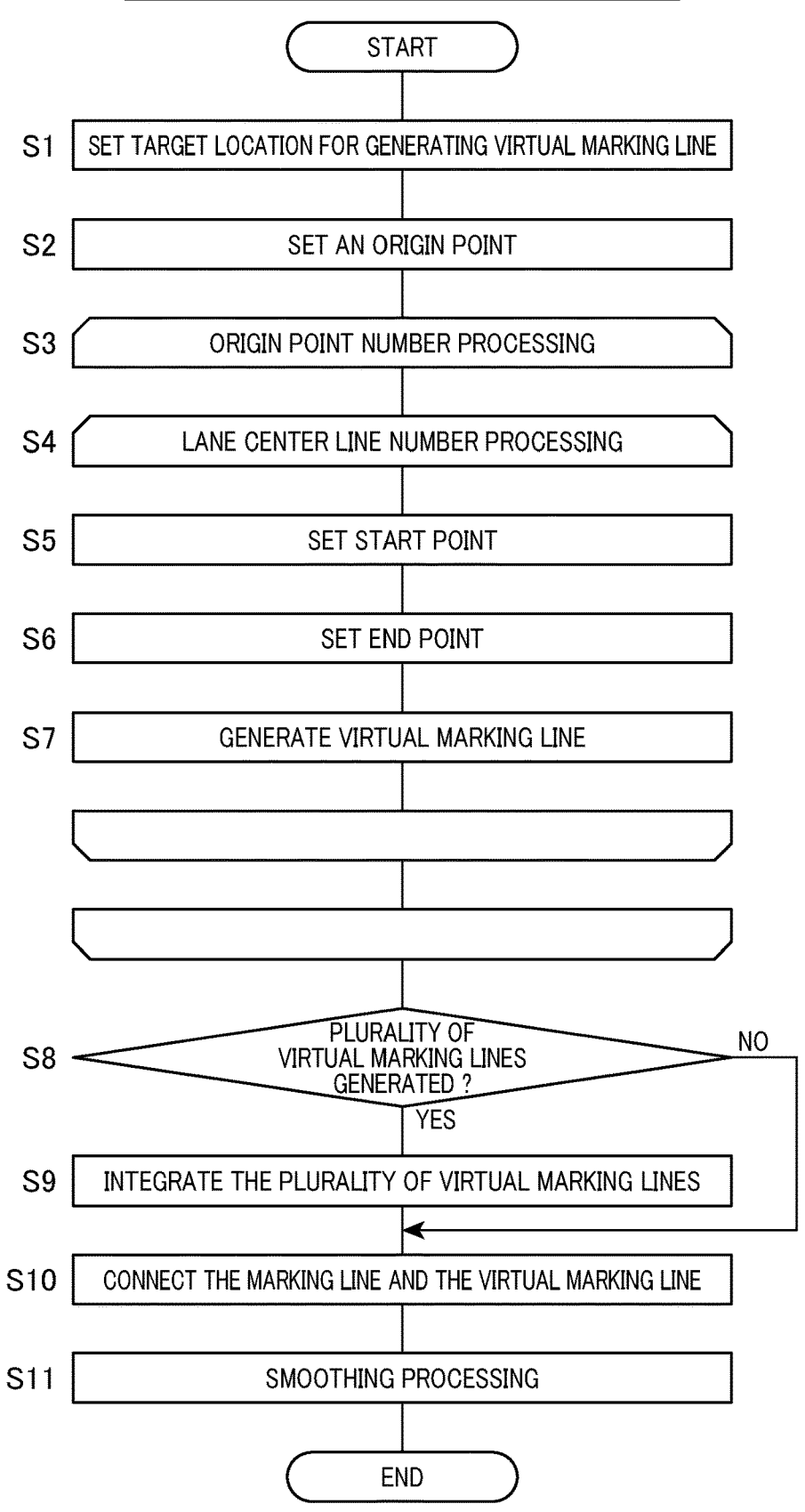

START

S1  SET TARGET LOCATION FOR GENERATING VIRTUAL MARKING LINE

S2  SET AN ORIGIN POINT

S3  ORIGIN POINT NUMBER PROCESSING

S4  LANE CENTER LINE NUMBER PROCESSING

S5  SET START POINT

S6  SET END POINT

S7  GENERATE VIRTUAL MARKING LINE

S8  PLURALITY OF VIRTUAL MARKING LINES GENERATED ?    NO

YES

S9  INTEGRATE THE PLURALITY OF VIRTUAL MARKING LINES

S10  CONNECT THE MARKING LINE AND THE VIRTUAL MARKING LINE

S11  SMOOTHING PROCESSING

END

MAP DATA DISTRIBUTION PROCESS

START

S21   READ OUT MAP DATA FROM MAP DATA STORAGE UNIT

S22   DISTRIBUTE MAP DATA TO VEHICLE-MOUNTED DEVICE

END

MAP GENERATION DEVICE, MAP GENERATION METHOD AND STORAGE MEDIUM

CROSS-REFERENCE TO RELATED APPLICATION

The present application is a continuation application of International Application No. PCT/JP2022/019681, filed on May 9, 2022, which claims priority to Japanese Patent Application No. 2021-093642, filed on Jun. 3, 2021. The contents of these applications are incorporated herein by reference in their entirety.

BACKGROUND

Technical Field

The present disclosure relates to a map generation device, a map generation method, and a storage medium.

BACKGROUND ART

High-precision map data is required, for example, to support autonomous driving. A technique is disclosed whereby, when a section of marking lines painted on a road surface is interrupted, a virtual marking line is generated between the ends of the interrupted section, and the marking lines are connected via a virtual marking line edge that is formed.

SUMMARY

In the present disclosure, provided is a map generating device as the following.

The map generating device includes: a generating target location setting unit configured to set, as a target location for generating a virtual marking line in map data, a region in which (I) there exists a lane center line and (II) part of a marking line does not exist; an origin point setting unit configured to set an origin point on the lane center line, in the target location; a start point setting unit configured to set a start point on a marking line that is parallel to the lane center line, with the start point being set in either a forward position or a rearward position relative to the origin point, with respect to a travel direction of the vehicle; an end point setting unit configured to set an end point on a marking line that is parallel to the lane center line, with the end point being set in the other one of the forward position and rearward position relative to the origin point, with respect to the travel direction of the vehicle; a virtual marking line generating unit configured to generate a virtual marking line by connecting the start point and the end point such that the virtual marking line overlaps the marking line on both a start point side and on an end point side; and a marking line connecting unit configured to connect the marking line and the virtual marking line.

BRIEF DESCRIPTION OF THE DRAWINGS

The above and other objects, features and advantages of the present disclosure will become more apparent from the following detailed description, given with reference to the accompanying drawings. In the drawings:

FIG. 8 is a diagram (part 3) showing an origin point;

FIG. 9 is a diagram (part 4) showing an origin point;

FIG. 18 is a diagram showing virtual marking line IDs;

FIG. 21 is a flowchart showing a virtual marking line generation process;

DETAILED DESCRIPTION OF THE PREFERRED EMBODIMENTS

Figure 1:
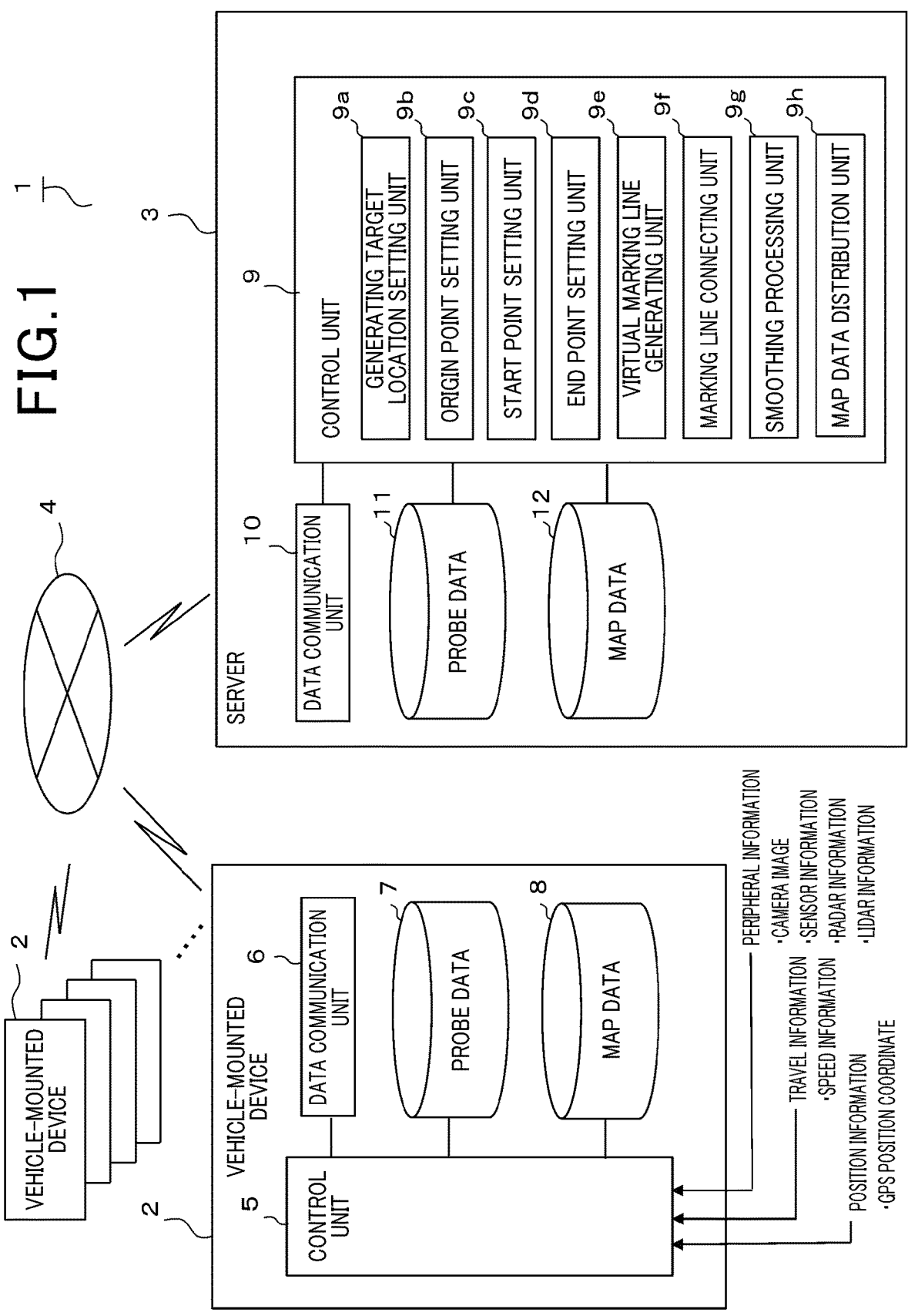
FIG. 1 is a functional block diagram showing the overall configuration of a map generation system according to a first embodiment.

PTL 1 and PTL 2 describe a technique whereby, when a section of marking lines painted on a road surface is interrupted, a virtual marking line is generated between the ends of the interrupted section, and the marking lines are connected via a virtual marking line edge that is formed.

[PTL 1]: Japanese Patent Publication No. 2018-87763
[PTL 2]: International Publication No. 2018/87763

The ends of a marking line are formed near the boundary between a point that is visible from a vehicle traveling on the road on which the marking line is painted and a point that is visible from a vehicle traveling on an intersecting road that intersects the first-mentioned road. Hence, depending on the shape of the traffic intersection, the ends of the marking lines may deviate from the vehicle travel trajectory. In such a case, connecting the ends of marking lines does not necessarily create a virtual marking line that can be used for vehicle control. That is, if the ends of the marking lines deviate from the travel trajectory, then if a virtual marking line is generated by connecting the ends of the marking lines and the vehicle travel trajectory is calculated based on the generated virtual marking line, meandering of the travel trajectory will occur. This may result in unstable steering.

On the other hand, it would be possible to calculate a vehicle travel trajectory that does not exhibit meandering, by modifying the marking lines whose end positions deviate from the travel trajectory. However, since real-world marking lines are necessary for use in specifying the position of a vehicle, it is not desirable to modify the marking lines in order to calculate a travel trajectory. Hence, map data having attributes that enable both travel trajectory calculation and vehicle position determination is necessary for enabling appropriate vehicle control.

An object of the present disclosure is to generate appropriate map data having attributes that enable both travel trajectory calculation and vehicle position determination.

According to one aspect of the present disclosure, a generating target location setting unit is configured to set, as a target location for generating a virtual marking line in map data, a region in which (I) there exists a lane center line based on a travel trajectory and (II) part of a marking line does not exist. An origin point setting unit is configured to set an origin point on the lane center line, in the target location for generating the virtual marking line. A start point setting unit is configured to set a start point on a marking line that is parallel to the lane center line on which the origin point is set, with the start point being set in either a forward position or a rearward position relative to the origin point, with respect to a travel direction of the vehicle. An end point setting unit is configured to set an end point on a marking line that is parallel to the lane center line on which the origin point is set, with the end point being set in the other one of the forward position and rearward position relative to the origin point, with respect to the travel direction of the vehicle. A virtual marking line generating unit is configured to generate a virtual marking line by connecting the start point and the end point such that the virtual marking line overlaps the marking line on both the start point side and the end point side. A marking line connecting unit is configured to connect the marking line and the virtual marking line.

The origin point is set on the lane center line in the target location for generating the virtual marking line, and the start point and the end point are set on a marking line that is parallel to the lane center line on which the origin point is set, with the start point and the end point positioned forward and rearward relative to the origin point, in the vehicle travel direction. A virtual marking line is generated by connecting the start point and the end point such that the virtual marking line overlaps overlap the marking line on both the start point side and the end point side, and the marking line and the virtual marking line are connected. By thus providing sections where the marking line and the virtual marking line overlap, it is possible to generate map data that has attributes of both virtual marking lines and real-world marking lines, in the vicinity of the overlapping sections, unlike the prior art method in which virtual marking lines are generated by connecting the ends of marking lines. As a result, it is possible to generate appropriate map data having attributes that enable both travel trajectory calculation and vehicle position determination.

An embodiment of the technology of the present disclosure is described in detail in the following with reference to the drawings. This embodiment is directed to countries and regions where the road traffic regulations stipulate that vehicles drive on the left. As shown in FIG. 1, a map generating system 1 is configured such that a vehicle-mounted device 2 mounted to a vehicle, and a server 3 disposed on a network side, can perform data communication via a communication network 4 that includes, for example, the Internet. The vehicle equipped with the vehicle-mounted device 2 may be a vehicle having an automatic driving function, or having no automatic driving function. Furthermore a vehicle having an automatic driving function may sequentially switch between automatic driving and manual driving. The vehicle-mounted devices 2 and the server 3 have a plurality-to-one relationship, whereby the server 3 can perform data communication with a plurality of the vehicle-mounted devices 2. The server 3 corresponds to a map generation device.

Peripheral information concerning the surroundings of the vehicle, travel information concerning vehicle travel, and position information concerning the vehicle position, is input to a vehicle-mounted device 2 from various sensors and various electronic control units (ECUs) mounted on the vehicle. The vehicle-mounted device 2 receives, as peripheral information, camera images taken by a vehicle-mounted camera in the direction in which the vehicle is traveling, sensor information obtained by detecting the vehicle surroundings by a sensor such as a millimeter wave sensor, radar information obtained by detecting the vehicle surroundings by radar, and lidar information obtained by detecting the vehicle surroundings by LiDAR (Light Detection and Ranging, Laser Imaging Detection and Ranging). Camera images can include traffic signals, traffic signs, billboards, marking lines painted on the road surface, stop lines at intersections, crosswalks, diamond-shaped markers at intersections, and the like. The vehicle-mounted device 2 may receive, as peripheral information, at least one of camera images, sensor information, radar information, and lidar information.

Vehicle speed information detected by a vehicle speed sensor is input to the vehicle-mounted device 2, as travel information. The vehicle-mounted device 2 also receives, as position information, GPS position coordinates that are determined based on GPS signals transmitted from GPS (Global Positioning System) satellites. The GPS position coordinates are coordinates indicating the vehicle position. The satellite positioning system is not limited to GPS, and various systems such as GLONASS, Galileo, BeiDou, and IRNSS, etc., can be adopted as GNSS (Global Navigation Satellite Systems).

The vehicle-mounted device 2 includes a control unit 5, a data communication unit 6, a probe data storage unit 7 and a map data storage unit 8. The control unit 5 is composed of a microcomputer having a CPU (Central Processing Unit), ROM (Read Only Memory), RAM (Random Access Memory), and I/O (Input/Output). The microcomputer executes a computer program that is stored in a non-transitory tangible storage medium, executes processing in accordance with the computer program, and controls the overall operation of the vehicle-mounted device 2. Here, the term "microcomputer" is synonymous with "processor". In the vehicle-mounted device 2, the non-transitory tangible storage medium may share hardware with other computer resources. The probe data storage unit 7 and the map data storage unit 8 may be configured mainly by non-transitory tangible storage medium that are independently provided with corresponding data.

The server 3 includes a control unit 9, a data communication unit 10, a probe data storage unit 11 and a map data storage unit 12. The control unit 9 is composed of a microcomputer having a CPU, ROM, RAM and I/O. The microcomputer executes a computer program stored in a non-transitory tangible storage medium, executes processing in accordance with the computer program, and controls the overall operation of the server 3. In the server 3, the non-transitory tangible storage medium may share hardware with other computer resources. The probe data storage unit 11 and the map data storage unit 12 may be configured mainly by non-transitory tangible storage medium that are independently provided with corresponding data.

In the vehicle-mounted device 2, when peripheral information, travel information and positional information are input, the control unit 5 generates probe data from the various input information, and stores the generated probe data in the probe data storage unit 7. The probe data is data that includes information on the surrounding environment, driving information and location information, including data indicating the positions, color, characteristics, relative positional relationship, etc., of traffic signals, traffic signs, signboards, marking lines, stop lines at intersections, pedestrian crosswalks, diamond-shaped markers laid in the road, etc. The probe data also includes data indicating the shape of the road on which the vehicle is traveling, the characteristics of the road, the width of the road, and the like.

The control unit 5 reads out the probe data stored in the probe data storage unit 7 when, for example, a predetermined time has elapsed, or the travel distance of the vehicle has reached a predetermined value, and causes the data communication unit 6 to transmit the read-out probe data to the server 3. It would be equally possible for the control unit 5 to be configured such as to cause the server 3 to send probe data transmission requests to the vehicle-mounted device 2 with a predetermined cycle, instead of being triggered in accordance with elapsed time or travel distance of the vehicle as described above. In that case, when a probe data transmission request transmitted from the server 3 is received by the data communication unit 6, the probe data stored in the probe data storage unit 7 is read out, triggered by receiving the probe data transmission request, and is sent from the data communication unit 6 to the server 3. For example, the control unit 5 may be configured such that when the vehicle ignition is switched on, the data communication unit 6 is caused to transmit, to the server 3, the probe data that has accumulated from the time of the previous ignition switch-on until the time of ignition switch-off, or configured such that when the ignition is switched off, the probe data that has accumulated from the time of the current ignition switch-on until the time of ignition switch-off is transmitted from the data communication unit 6 to the server 3. Furthermore it would be equally possible for the control unit 5 to cause the probe data to be transmitted from the data communication unit 6 to the server 3 in segment units, which are predetermined area units for map management, or to cause the probe data to be transmitted from the data communication unit 6 to the server 3 in predetermined area units which are unrelated to the segment units, when the probe data is transmitted from the data communication unit 6 to the server 3.

The map data storage unit 8 stores highly accurate map data, for providing driving assistance. The map data stored in the map data storage unit 8 includes three-dimensional map information, feature information, road attribute value information, and the like. The three-dimensional map information includes point groups of characteristic points in road shapes or on structures. The feature information concerns the shapes and positions of marking lines, stop lines at intersections, pedestrian crosswalks, diamond-shaped marks in intersections, and the like. The road attribute value information is information concerning lanes in a road, such as information about the number of lanes, the presence or absence of a dedicated right-turn lane, and the like. The map data stored in the map data storage unit 8 is sequentially updated by downloading map data stored in the map data storage unit 12 of the server 3 (as described hereinafter) from the server 3 to the vehicle-mounted device 2.

The map data storage unit 12 in the server 3 stores highly accurate map data, for providing driving assistance. A greater amount of map data is stored in the map data storage unit 12 than in the map data storage unit 8 of the vehicle-mounted device 2, and the map data stored in the map data storage unit 12 expresses information for a wide area. The control unit 9 receives the probe data transmitted from the vehicle-mounted device 2 and stores the received probe data in the probe data storage unit 11. The control unit 9 also reads out the probe data stored in the probe data storage unit 11, and sequentially reflects the read-out probe data in the map data stored in the map data storage unit 12, to sequentially update the map data stored in the map data storage unit 12. That is, the map data stored in the map data storage unit 12 is integrated map data, generated by sequentially reflecting a plurality of sets of probe data.

When marking lines are painted on the road surface, there may be sections in which a marking line is interrupted. A method is known of generating a virtual marking line connecting the ends of such a marking line. However at a traffic intersection, depending on the shape of the traffic intersection, the positions of the ends of a marking line may deviate from the travel trajectory. In this case, even if virtual marking lines are generated by connecting the ends of marking lines, it is not possible to calculate an appropriate travel trajectory based on the generated virtual marking lines. It is conceivable that the positions of these marking lines whose end positions deviate from the vehicle travel trajectory could be modified for vehicle travel use. However such modification of the positions of marking lines is undesirable, since the positions of real-world marking lines are necessary for calculating the position of the own vehicle. Hence, from the above considerations, the server 3 of the present embodiment has functions for appropriately generating map data having attributes that enable both calculation of travel trajectories and determining the position of the own vehicle. These functions of the server 3 are as follows.

In the server 3, the control unit 9 includes a generating target location setting unit 9a, an origin point setting unit 9b, a start point setting unit 9c, an end point setting unit 9d, a virtual marking line generating unit 9e, a marking line connecting unit 9f, a smoothing processing unit 9g and a map data distribution unit 9h. These units 9a to 9h correspond to parts of respective functions executed by the map generation program. That is, the control unit 9 performs the functions of the units 9a to 9h by executing part of the map generation program.

Figure 4:
FIG. 4 is a diagram (part 3) showing a target location for generating a virtual marking line.
Figure 5:
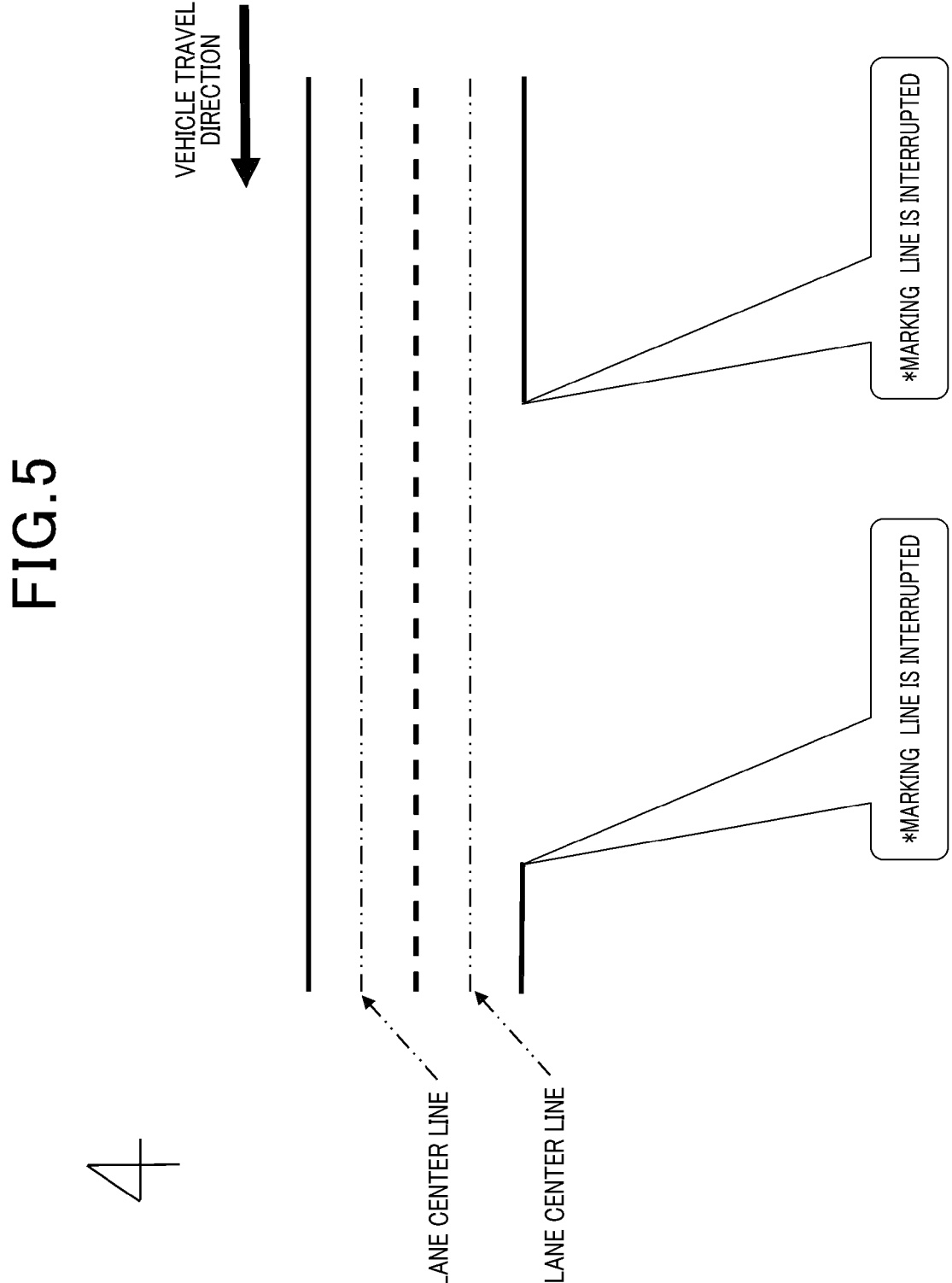
FIG. 5 is a diagram (part 4) showing a target location for generating a virtual marking line.

The generating target location setting unit 9a sets, as a target location for generating a virtual marking line, a location in which there is a lane center line based on a vehicle travel trajectory, in the map data stored in the map data storage unit 12, but where part of a marking line does not exist. As specific examples, the generating target location setting unit 9a sets, as target locations for generating virtual marking lines, the interior of a traffic intersection of the form shown in FIG. 2, a location containing a lane branch point as shown in FIG. 3, a location containing a lane merge point as shown in FIG. 4, and a location containing points where a marking line is interrupted, as shown in FIG. 5.

Figure 6:
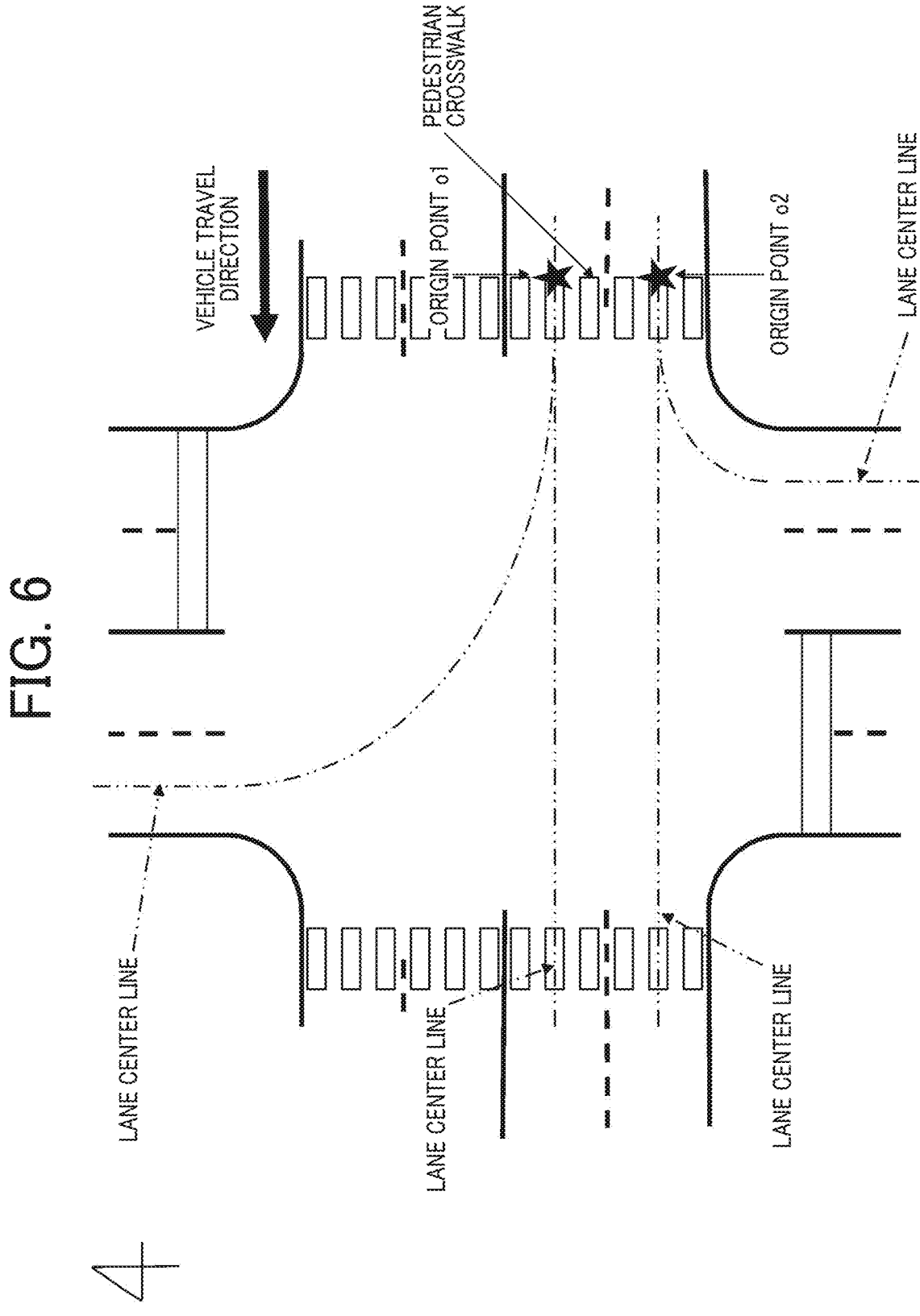
FIG. 6 is a diagram (part 1) showing origin points.

The origin point setting unit 9b sets an origin point on the lane center line in the location for generating a virtual marking line. Specifically, if the virtual marking line generation target location is set as the interior of the traffic intersection shown in FIG. 2 and there is a stop line in that intersection, then as shown in FIG. 6, since there are two lanes entering the traffic intersection from the east direction and leaving the traffic intersection in the west direction, the origin point setting unit 9*b* sets the origin points o1 and o2 at the positions where the lane center line of each lane intersects the stop line. If there is no stop line in the traffic intersection, but there is a pedestrian crosswalk that also serves as a stop line, then the origin point setting unit 9*b* sets the origin points at the points of intersection between the pedestrian crosswalk and the respective lane center lines.

Figure 3:
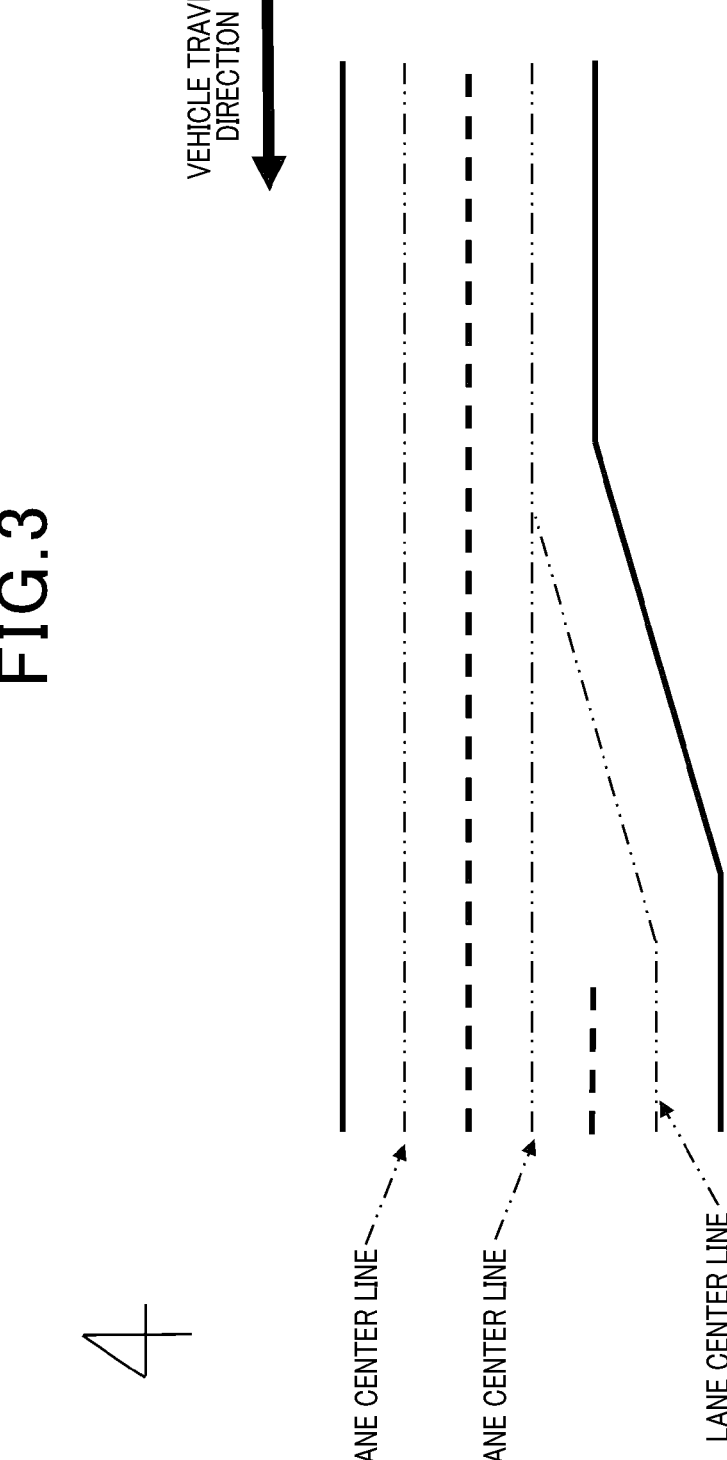
FIG. 3 is a diagram (part 2) showing a target location for generating a virtual marking line.
Figure 7:
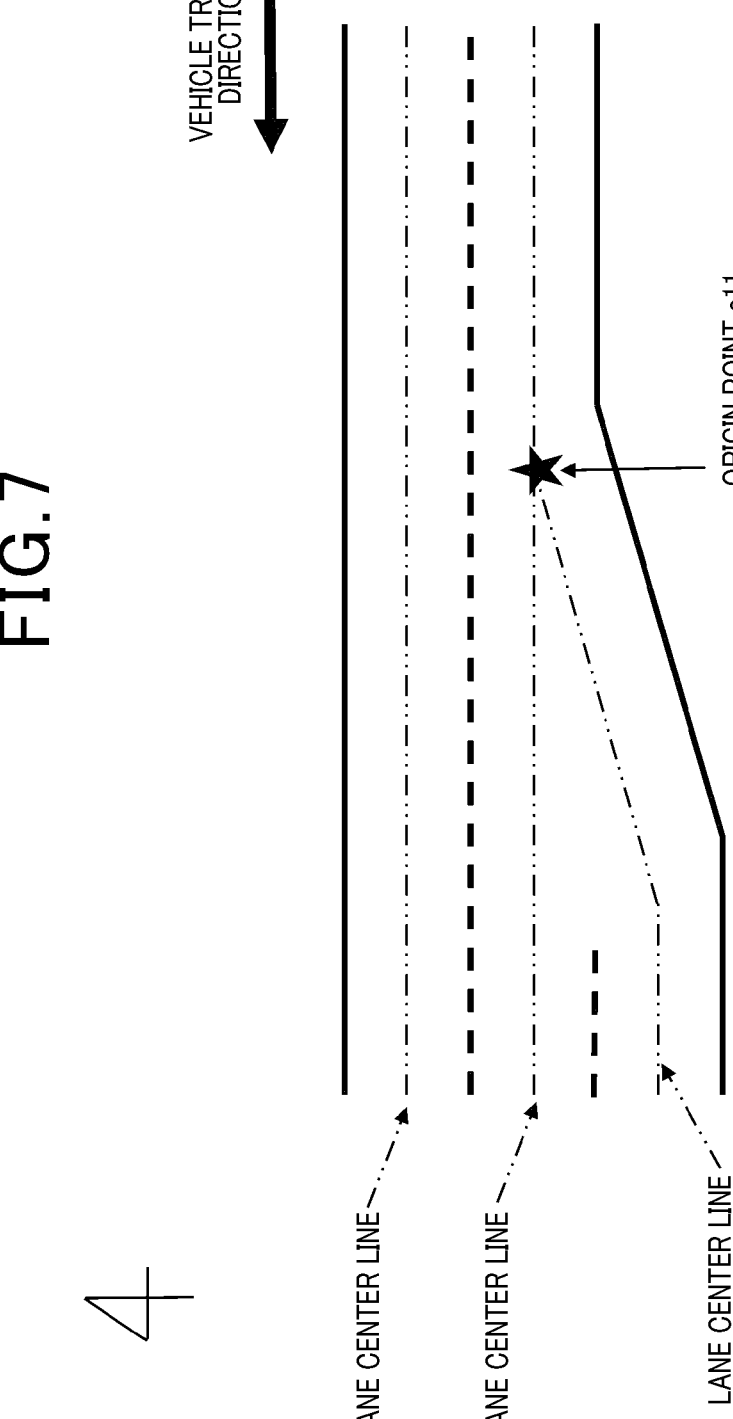
FIG. 7 is a diagram (part 2) showing an origin point.
Figure 8:
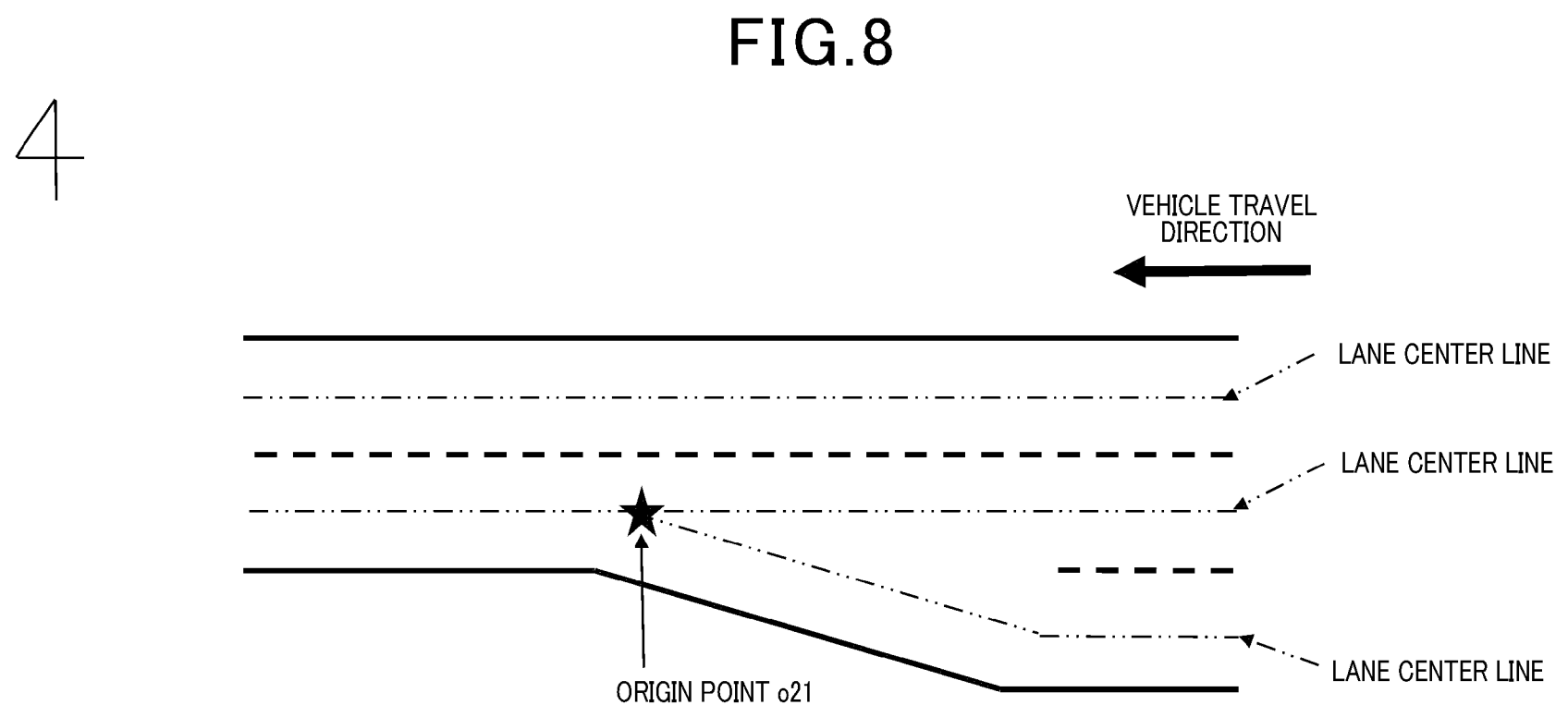

When the virtual marking line generation target location contains a lane branch point as shown in FIG. 3, then as shown in FIG. 7, the origin point setting unit 9*b* sets an origin point o11 at the point where the lane center line branches. If the virtual marking line generation target location contains a lane merge point, as shown in FIG. 4, then as shown in FIG. 8, the origin point setting unit 9*b* sets an origin point o21 at the point where the lane center lines merge. If the virtual marking line generation target location is set to contain a position where a marking line is interrupted, as shown in FIG. 5, then as shown in FIG. 9, the origin point setting unit 9*b* sets an origin point o31 at a position that corresponds, in the lane width direction, to the point where the marking line is interrupted.

The start point setting unit 9*c* sets a start point on a marking line that is parallel to a lane centerline on which an origin point is set, with the start point being positioned on one of front and rear of the origin point with respect to the travel direction of the vehicle. The end point setting unit 9*d* sets an end point on a marking line that is parallel to a lane center line on which an origin point is set, with the end point being positioned on the other one of front and rear of the origin point with respect to the travel direction of the vehicle. In that case, a section of the marking line extending from the end point or from the start point to the origin point, with respect to the lane width direction, becomes a section where there is overlap between the marking line and a virtual marking line (described hereinafter). That is, as the distance is increased to a start point or an end point from a position corresponding, in the lane width direction, to an origin point on a marking line, the overlapping section will become relatively longer, while as the distance becomes relatively shorter, the overlapping section becomes relatively shorter.

Figure 2:
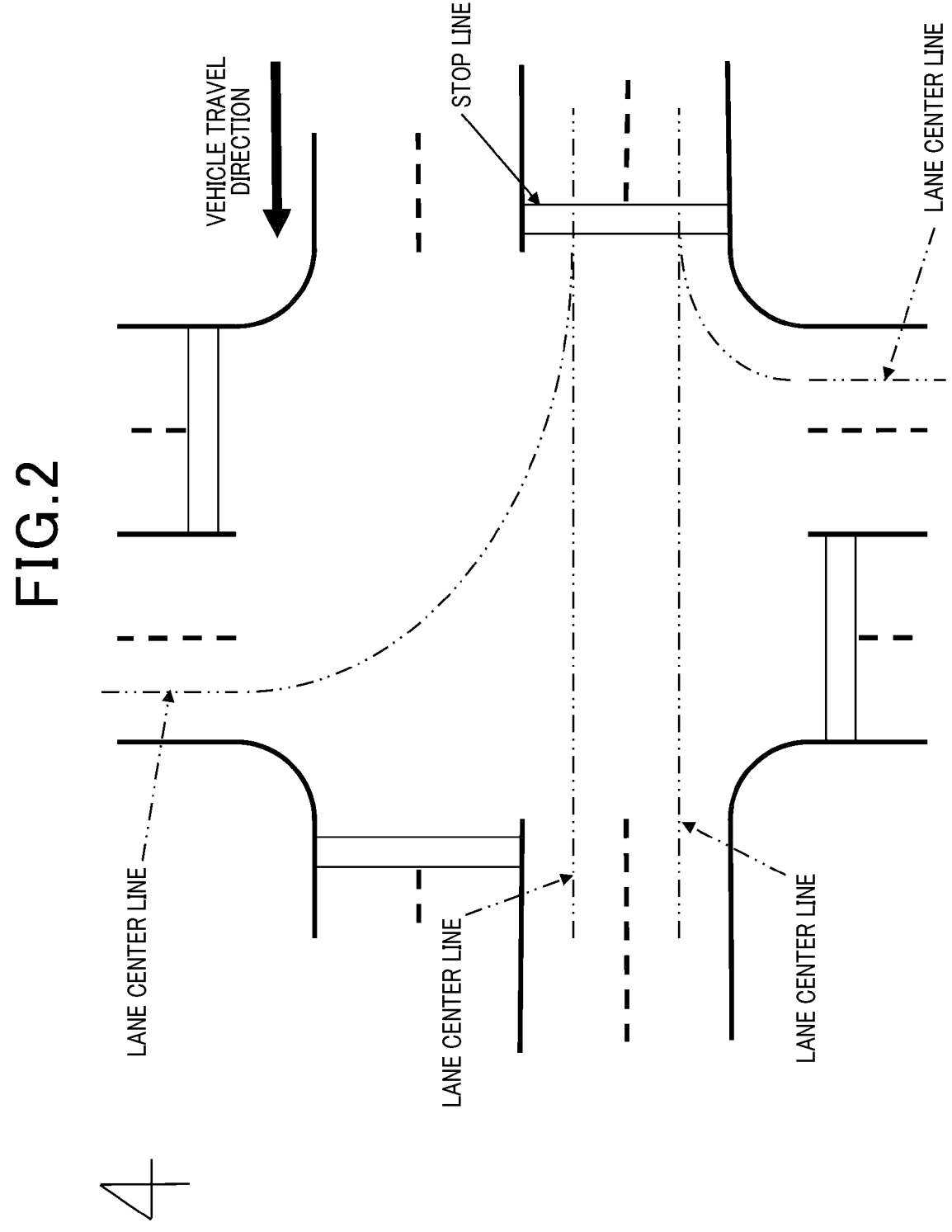
FIG. 2 is a diagram (part 1) showing a target location for generating virtual marking lines.
Figure 10:
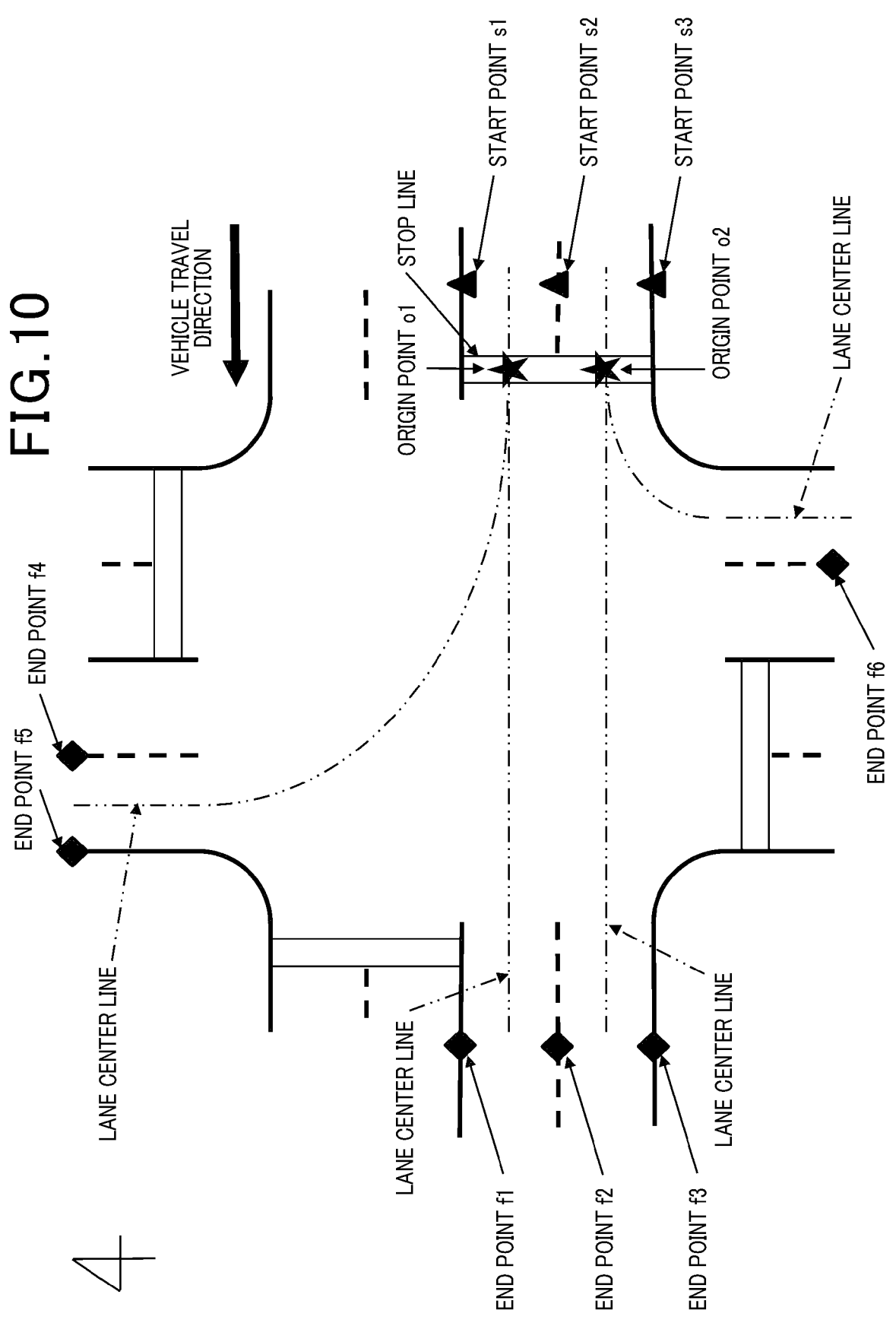
FIG. 10 is a diagram (part 1) showing start points and end points.
Figure 11:
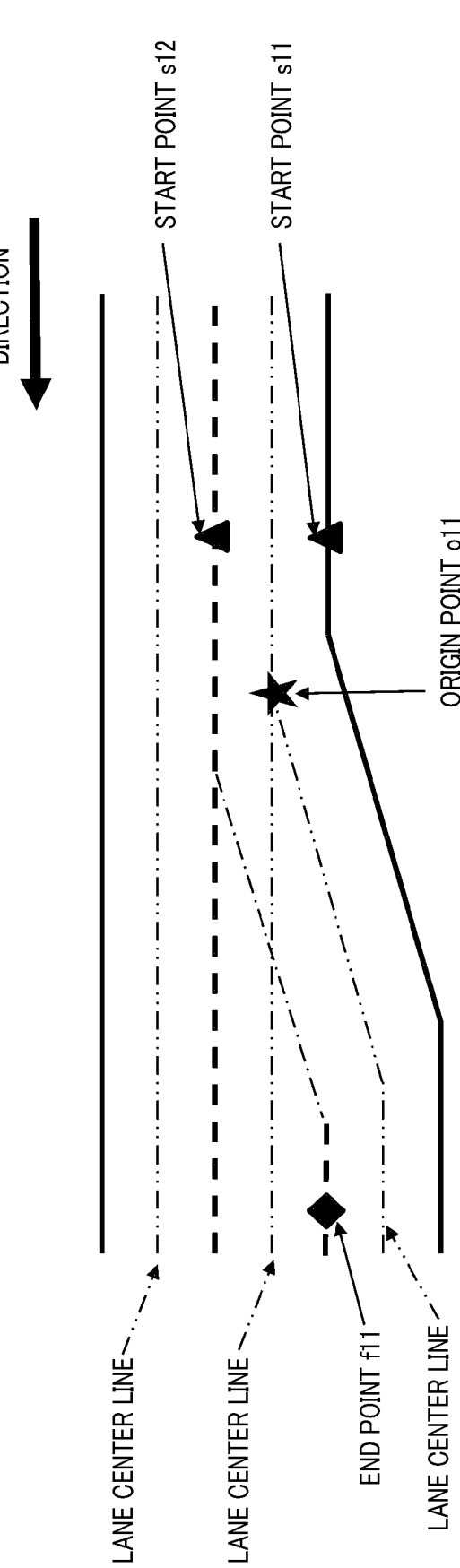
FIG. 11 is a diagram (part 2) showing start points and an end point.

Specifically, with the interior of the traffic intersection shown in FIG. 2 set as a target location for generating a virtual marking line, the start point setting unit 9*c* sets the start points s1 to s3 on the marking lines behind the origin points o1 and o2 with respect to the travel direction of the vehicle, as shown in FIG. 10. In addition, the end point setting unit 9*d* sets the end points f1 to f6 on the marking lines, ahead of the origin points o1 and o2 with respect to the travel direction of the vehicle. If a location containing a lane branch point, as shown in FIG. 3, is set as a virtual marking line generation target location, then as shown in FIG. 11, the start point setting unit 9*c* sets start points s11 and s12 on the marking lines, behind the origin point o11 with respect to the travel direction of the vehicle. The end point setting unit 9*d* sets an end point f11 on a marking line, ahead of the origin point o11 with respect to the travel direction of the vehicle.

Figure 12:
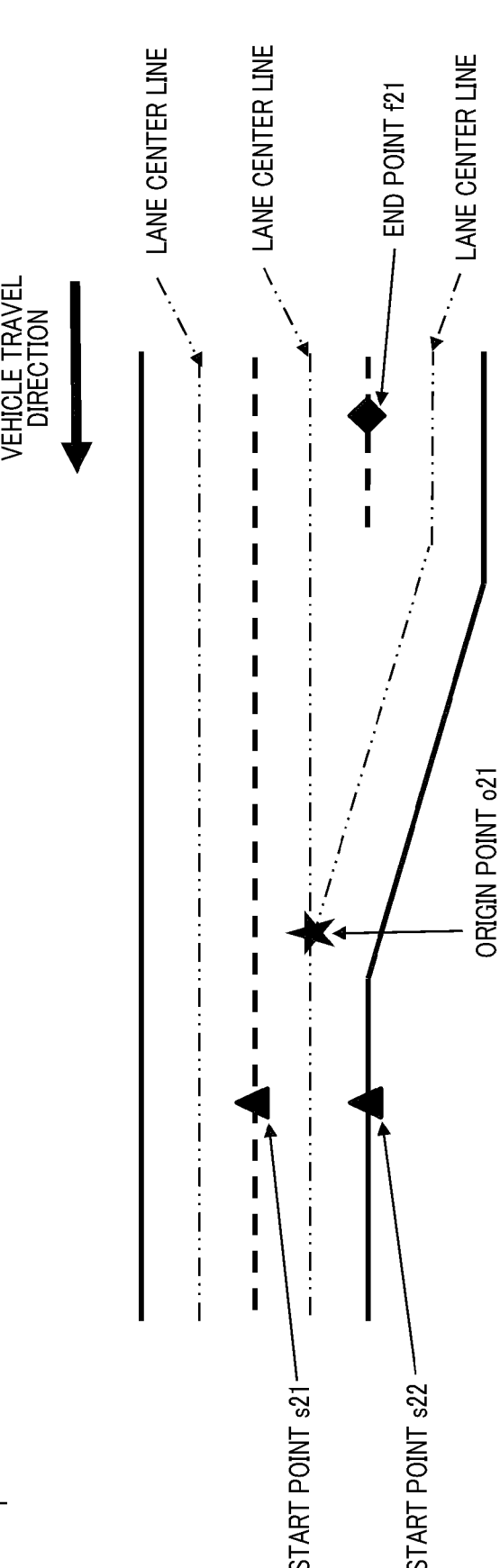
FIG. 12 is a diagram (part 3) showing a tart point and an origin point.
Figure 13:
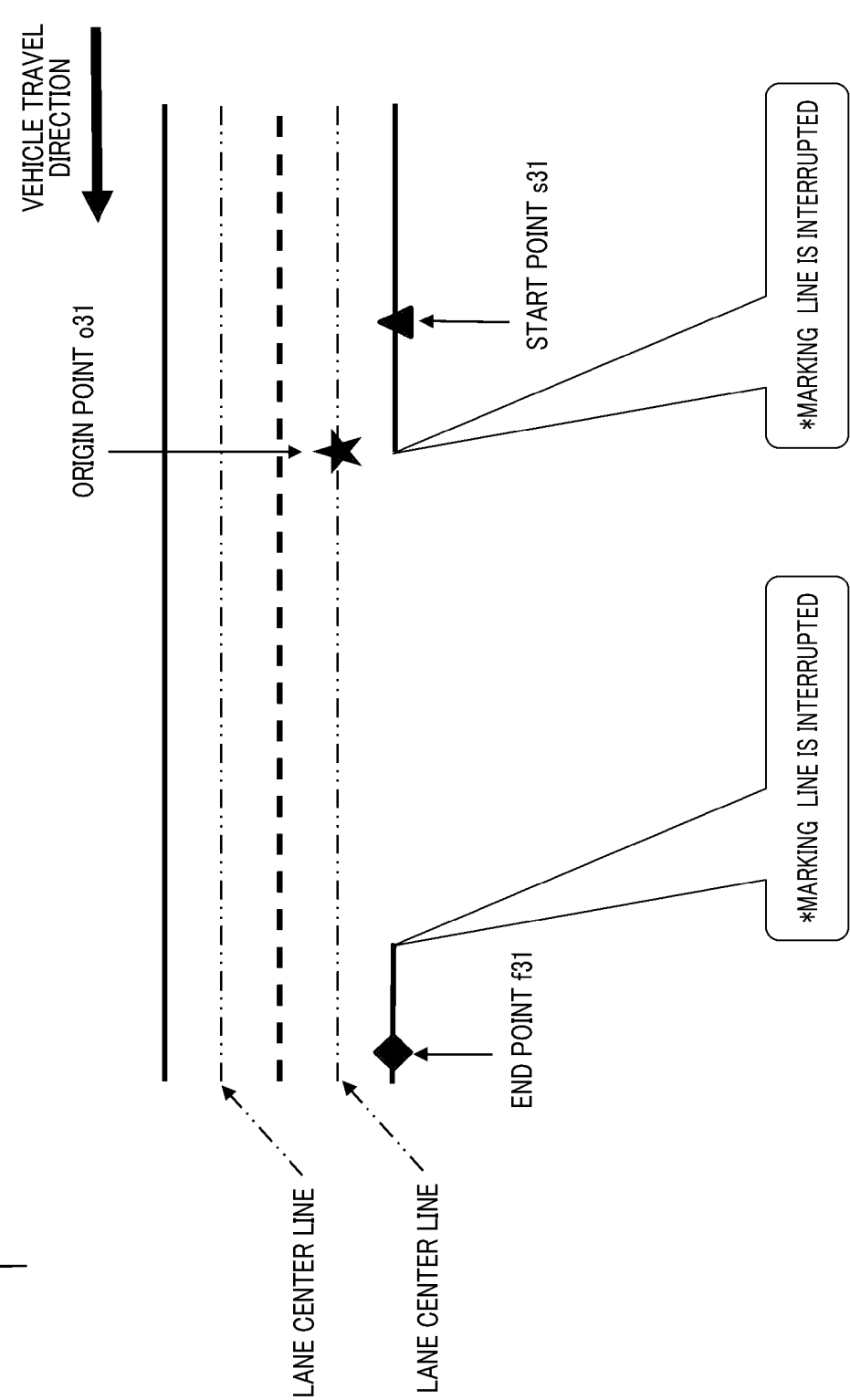
FIG. 13 is a diagram (part 4) showing a start point and an end point.

When a location containing a lane merge point as shown in FIG. 4 is set as a virtual marking line generation target location, then as shown in FIG. 12, the start point setting unit 9*c* sets start points s21 and s22 on the marking lines, ahead of the origin point o21*a* with respect to the travel direction of the vehicle. Furthermore the end point setting unit 9*d* sets an end point f21 on a marking line at a position behind the origin point o21 with respect to the travel direction of the vehicle. When a location containing a position where a marking line is interrupted, as shown in FIG. 5, is set as a virtual marking line generation target location, then as shown in FIG. 13, the start point setting unit 9*c* sets a start point s31 on the marking lines, behind the origin point o31 with respect to the travel direction of the vehicle. The end point setting unit 9*d* also sets an end point f31 on the marking line, ahead of the origin point o31 with respect to the travel direction of the vehicle.

In other words, in FIGS. 10 to 12, with reference to the origin points o1, o2, o11, and o21, the start point setting unit 9*c* sets the start points s1 to s3, s11, s12, s21, and s22 at positions separated by a first predetermined distance from the origin points o1, o2, o11, and o21, in the direction in which a plurality of lane center lines become a single lane center line. With reference to the origin points o1, o2, o11, and o21, the end point setting unit 9*d* sets the end points f1 to f6, f11 and f21 at positions separated by a second predetermined distance from the origin points o1, o2, o11, o21, in the direction in which a lane center line changes from one to a plurality of lane center lines.

In FIG. 13, with reference to the origin point o31, the start point setting unit 9*c* sets a start point s31 at a position separated by a first predetermined distance from the origin point o31, in the direction in which marking lines exist on both sides of the lane center line. Furthermore, with reference to the origin point o31, the end point setting unit 9*d* sets an end point f31 at a position separated by a second predetermined distance from an appearance point, in the opposite direction to the direction in which marking lines exist on both sides of the lane center line, where the appearance point is the point at which the marking lines appear on both sides of the lane center line.

Figure 14:
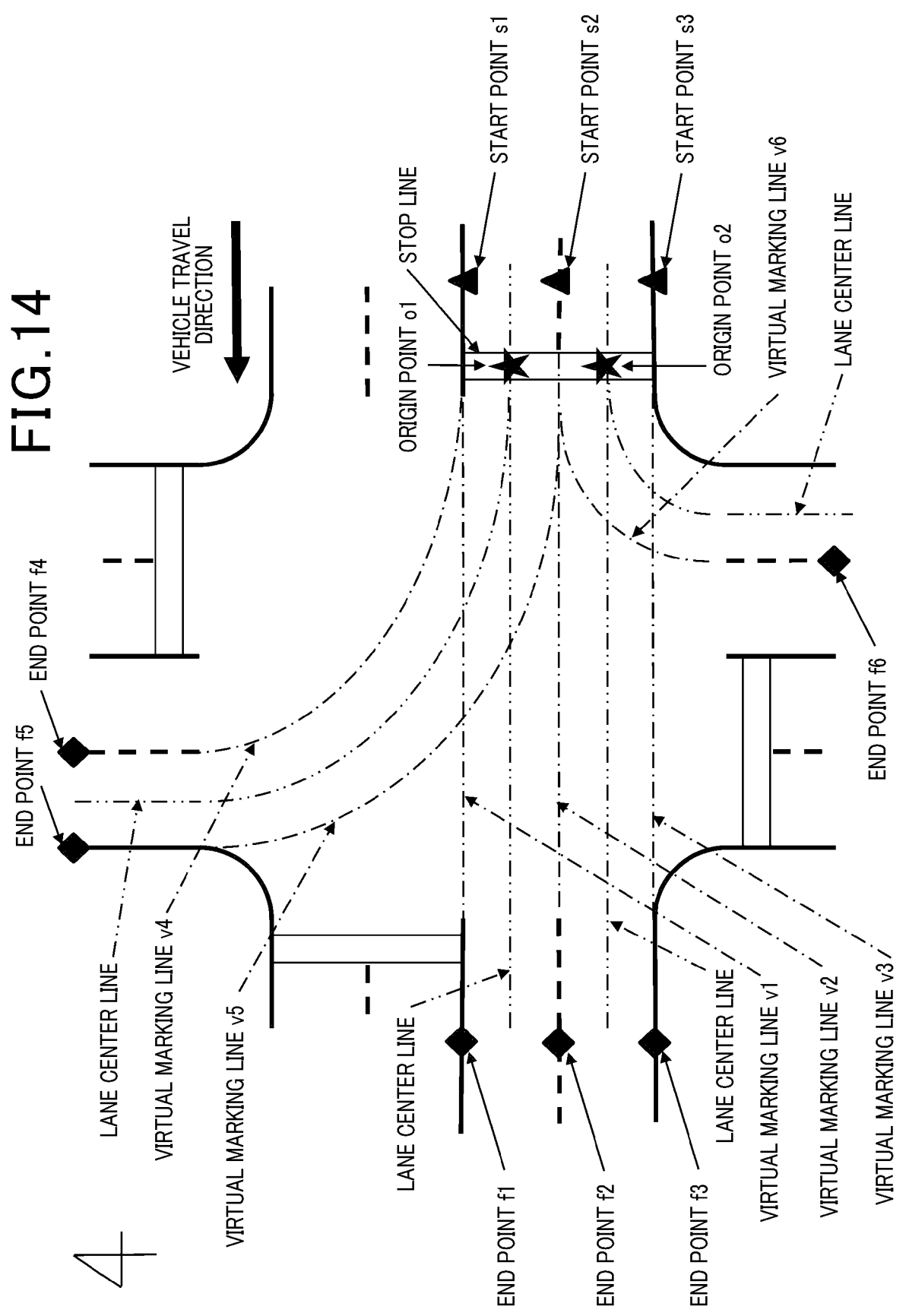
FIG. 14 is a diagram (part 1) showing virtual marking lines.

The virtual marking line generating unit 9*e* generates a virtual marking line by connecting the start point and the end point such that the virtual marking line overlaps the marking line at both the start point side and the end point side. Specifically, when the interior of the traffic intersection shown in FIG. 2 is set as the virtual marking line generating target location, then as shown in FIG. 14, the virtual marking line generating unit 9*e* generates a virtual marking line v1 connecting the start point s1 and the end point f1, a virtual marking line v2 connecting the start point s2 and the end point f2, a virtual marking line v3 connecting the start point s3 and the end point f3, a virtual marking line v4 connecting the start point s1 and end point f4, a virtual marking line v5 connecting the start point s2 and the end point f5, and a virtual marking line v6 connecting the start point s2 and the end point f6.

Figure 15:
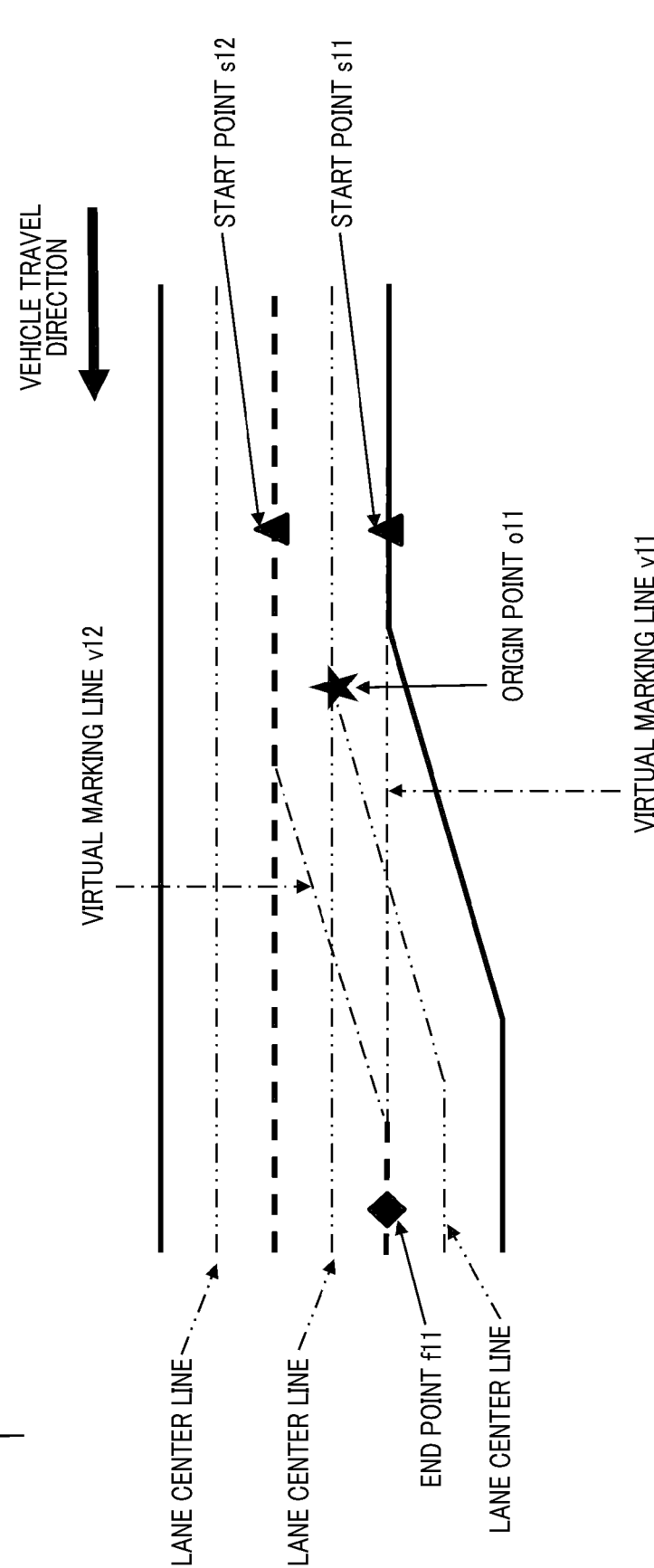
FIG. 15 is a diagram (part 2) showing virtual marking lines.
Figure 16:
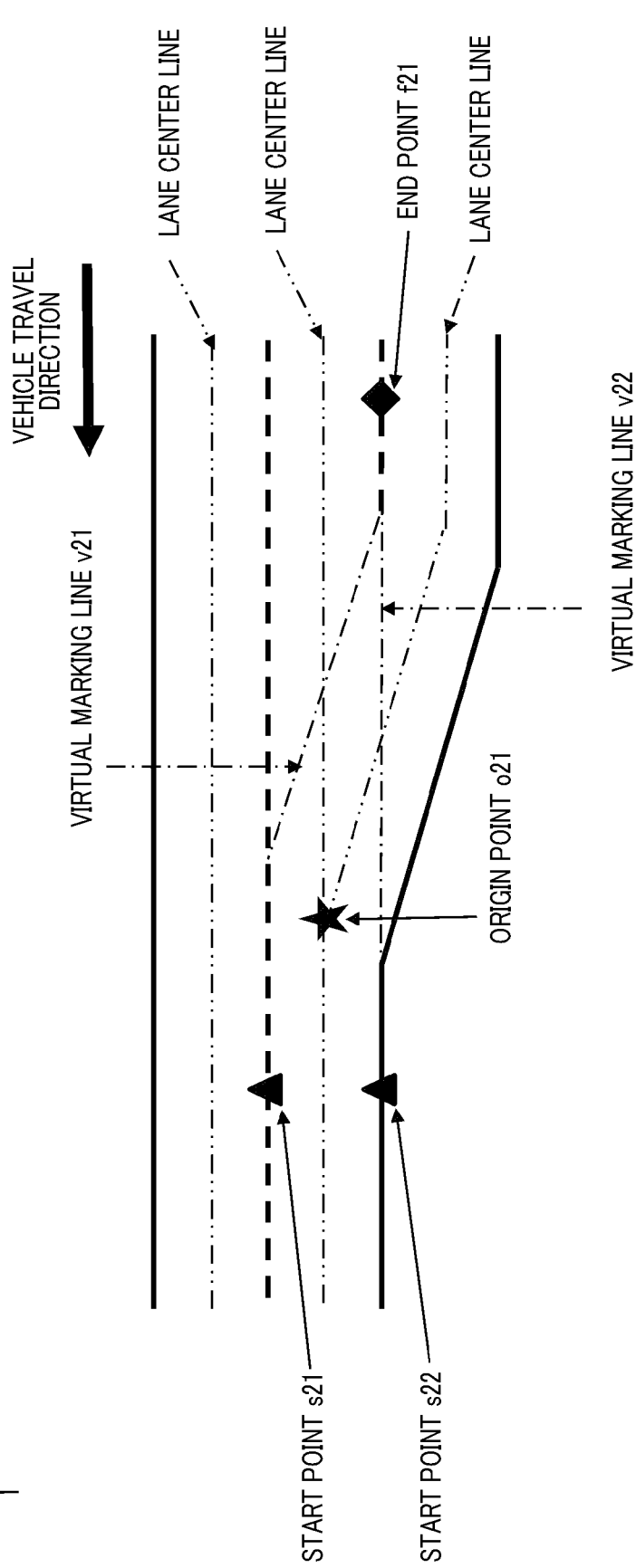
FIG. 16 is a diagram (part 3) showing virtual marking lines.
Figure 17:
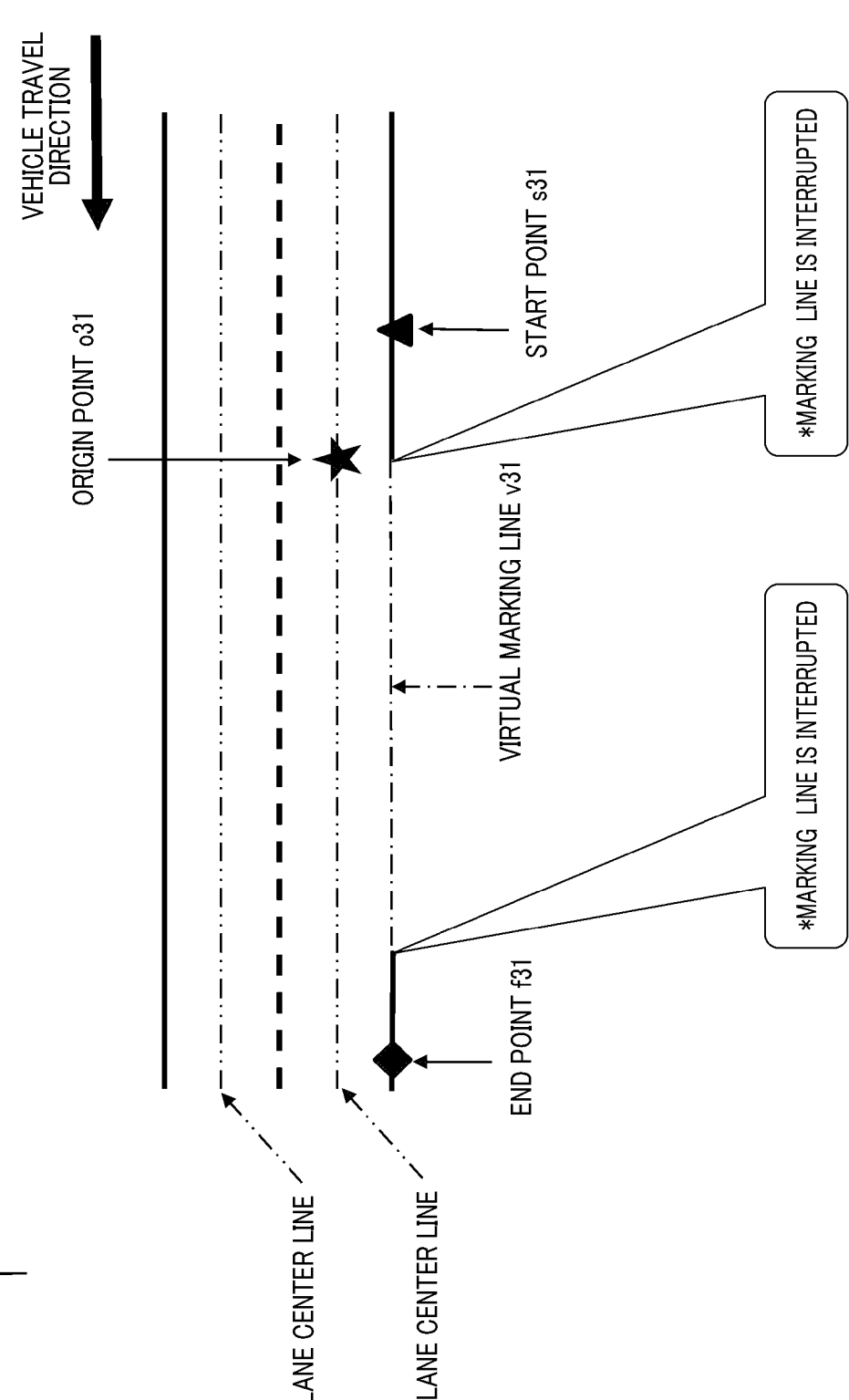
FIG. 17 is a diagram (part 4) showing a virtual marking line.

When a location including a lane branch point as shown in FIG. 3 is set as a target location for generating a virtual marking line, then as shown in FIG. 15, the virtual marking line generating unit 9*e* generates a virtual marking line v11 connecting the start point s11 and the end point f11, and a virtual marking line v12 connecting the start point s12 and the end point f11. When a location including a lane merge point as shown in FIG. 4 is set as a target location for virtual marking line generation, then as shown in FIG. 16, the virtual marking line generating unit 9*e* generates a virtual marking line v21 connecting the start point s21 and the end point f21, and a virtual marking line v22 connecting the start point s22 and the end point f21. When a location including a lane interruption section as shown in FIG. 5 is set as a target location for virtual marking line generation, then as shown in FIG. 17, the virtual marking line generating unit 9*e* generates a virtual marking line v31 connecting the start point s31 and the end point f31.

After generating a virtual marking line in this manner, the virtual marking line generating unit 9e assigns a virtual marking line ID (identifier) to the generated virtual marking line. For example, regarding the virtual marking line v1, as shown in FIG. 18, if the virtual marking line generating unit 9e assigns the marking line ID "101" to the marking line having the start point s1 and assigns the marking line ID "111" to the marking line having the end point f1, then the virtual marking line v1 is given the virtual marking line ID "101111".

Figure 19:
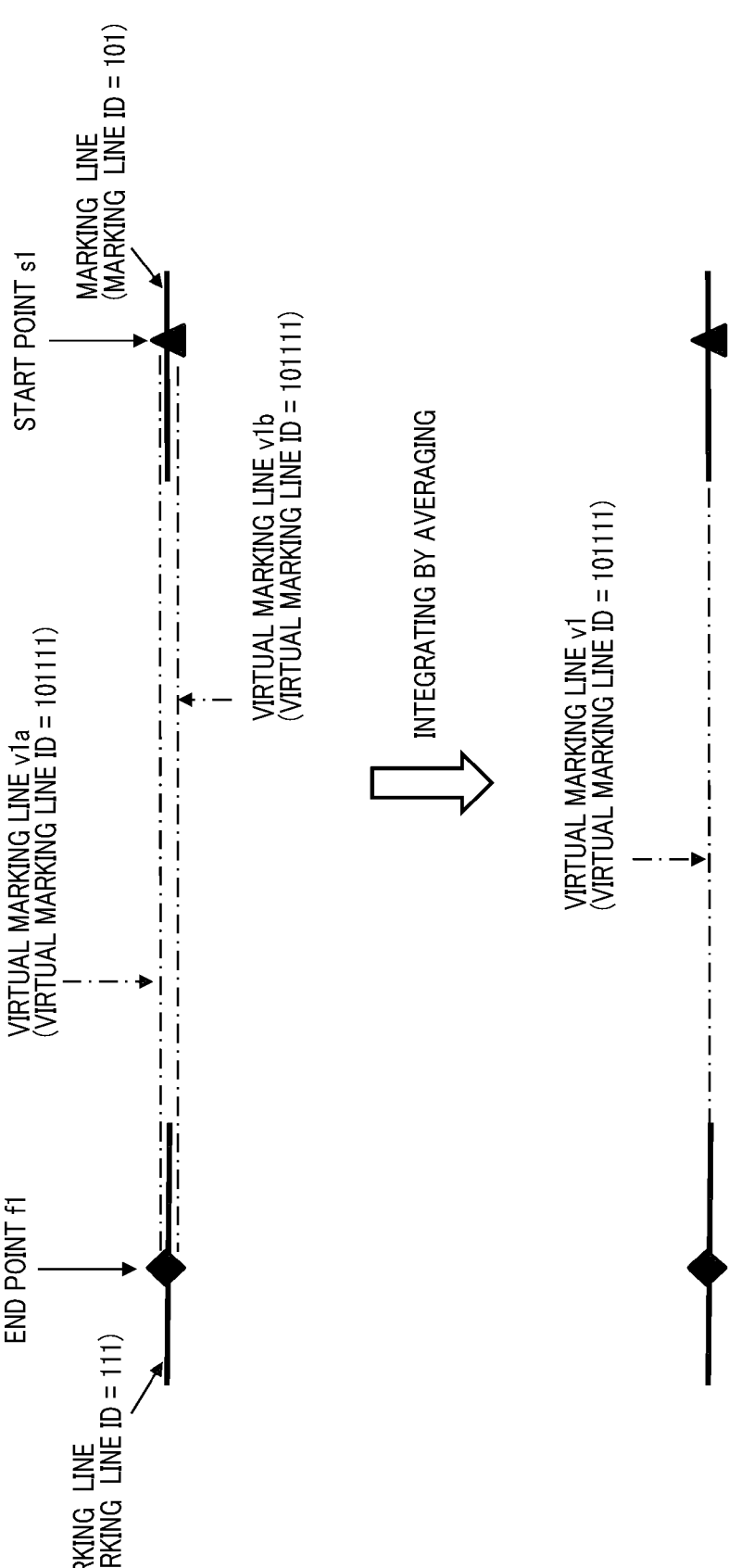
FIG. 19 is a diagram showing a process of integrating by averaging.

Further, if the virtual marking line generating unit 9e generates a plurality of virtual marking lines for one marking line, it integrates the plurality of virtual marking lines to generate a single virtual marking line. For example, if as shown in FIG. 19 the virtual marking line generating unit 9e generates two virtual marking lines v1a and v1b as the virtual marking line v1 that connects the start point s1 and the end point f1, then these virtual marking lines v1a and v1b are integrated by averaging to generate a single virtual lane v1. Even if three or more virtual marking lines are generated for one marking line, the virtual marking line generating unit 9e integrates these generated virtual marking lines by averaging. For other virtual marking lines also, if a plurality of virtual marking lines are generated with respect to a single marking line, the virtual marking line generating unit 9e integrates the plurality of virtual marking lines to generate a single virtual marking line.

Figure 20:
FIG. 20 is a diagram showing a smoothing process.

The marking line connecting unit 9f connects a virtual marking line to a marking line in the sections where there is overlap between the virtual marking line and the marking line. For example, regarding the virtual marking line v1, as shown in FIG. 20, in which the marking line connecting unit 9f connects a virtual marking line to a marking line in the sections of overlap between the marking line and the virtual marking line. The smoothing processing unit 9g performs smoothing processing, using a predetermined function, on the connecting sections between a marking line and a virtual marking line. The marking line connecting unit 9f similarly performs smoothing processing on other virtual marking lines.

The map data distribution unit 9h reads out the map data from the map data storage unit 12 and distributes the read-out map data from the data communication unit 10 to a vehicle-mounted device 2, if the conditions for distribution of the map data are satisfied. That is, when the above-described virtual marking lines are reflected in the read-out map data, the map data distribution unit 9h causes the data communication unit 10 to distribute the map data reflecting the virtual marking lines to the vehicle-mounted device 2. The map data reflecting the virtual marking lines is stored in the storage medium of the vehicle-mounted device, and the virtual marking lines reflected on the map data can be utilized by reading the map data from the storage medium.

Figure 22:
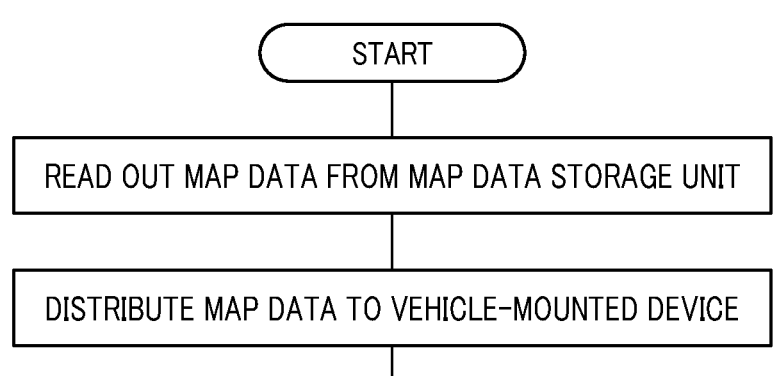
FIG. 22 is a flowchart showing a map data distribution process.

The operation of the above configuration will next be described with reference to FIGS. 21 and 22. In the server 3, the control unit 9 performs virtual marking line generation processing for generating virtual marking lines, and map data distribution processing for distributing map data to the vehicle-mounted devices 2.

(1) Virtual Marking Line Generation Processing

When the conditions for starting virtual marking line generation processing are satisfied and the virtual marking line generation processing is started, the control unit 9 sets a target location for generating a virtual marking line (S1, generating target location setting procedure). The control unit 9 then sets an origin point on a lane center line in the virtual marking line generation target location (S2, origin point setting procedure).

When the control unit 9 sets an origin point, it executes the following processing with respect to that origin point. Line number processing (S4) of the lane center lines is performed with respect to the origin point, the origin point is changed, point number processing of the origin points is performed (S3), and the processes S5 to S7 described in the following are executed. Specifically, the control unit 9 sets a start point on a marking line that is parallel to the lane center line on which the origin point has been set (S5, start point setting procedure), and sets an end point on the marking line (S6, end point setting procedure). The control unit 9 then generates a virtual marking line that connects the start point and the end point such that the virtual marking line overlaps the marking line on both the start point side and the end point side, and assigns a virtual marking line ID (identifier) to the generated virtual marking line (S7, virtual marking line generating procedure).

The control unit 9 executes the processes S5 to S7, for each origin point, by a number of times equal to the entire number of lane center lines, with the origin point being updated each time. When this point number processing has been performed for all of the origin points, the control unit 9 judges whether a plurality of virtual marking lines have been generated with respect to a single marking line (S8). If it is judged that a plurality of virtual marking lines have been generated for one marking line (S8: YES), the control unit 9 integrates the plurality of virtual marking lines to generate a single virtual marking line (S9). The control unit 9 then connects the marking lines and the virtual marking lines in the sections where the marking lines and the virtual marking lines overlap (S10, marking line connection process), and performs smoothing processing of the connecting sections between the marking lines and the virtual marking lines by using a predetermined function (S11). The virtual marking line generation process is then terminated, and the system waits until the conditions for next starting the virtual marking line generation process become established.

(2) Map Data Distribution Processing

When the data communication unit 10 receives a map data transmission request, for example, transmitted from a vehicle-mounted device 2 and the conditions for starting the map data distribution processing are satisfied, the control unit 9 starts the map data distribution processing. In this, the control unit 9 reads out, from the map data storage unit 12, map data for the surroundings of the position of the vehicle carrying the vehicle-mounted device 2 which sent the request for transmission of map data (B11). The control unit 9 causes the data communication unit to distribute the read-out map data to the vehicle-mounted device 2 (B12), ends the map data distribution process, and waits for establishment of conditions for starting the next execution of the map data distribution process. That is, if the read-out map data reflects virtual marking lines, the map data distribution unit 9e causes the data communication unit 10 to distribute the map data reflecting the virtual marking lines to the vehicle-mounted device 2.

Thereafter, when map data distributed by the server 3 is received by the data communication unit 6 of the vehicle-mounted device 2, the control unit 5 of the vehicle-mounted device 2 performs vehicle control based on the map data. That is, when using map data in which virtual marking lines are reflected, the control unit 5 uses the data as follows. In locations where there are marking lines, the control unit 5 specifies the position of the vehicle based on actual real-world marking lines. At a traffic intersection that does not contain marking lines, a location that contains a lane branch point, a location that contains a lane merge point, or a location that contains a position where a marking line is interrupted, the control unit 5 calculates the travel trajectory based on the virtual marking lines.

Cases have been described above in which a traffic intersection, a location that contains a branch point, a location that contains a merge point, and a location that contains a position where a marking line is interrupted are set as target locations for generation of virtual marking lines. However locations other than those described above can be set by the control unit 9 as locations for which virtual marking lines are to be generated.

Figure 23:
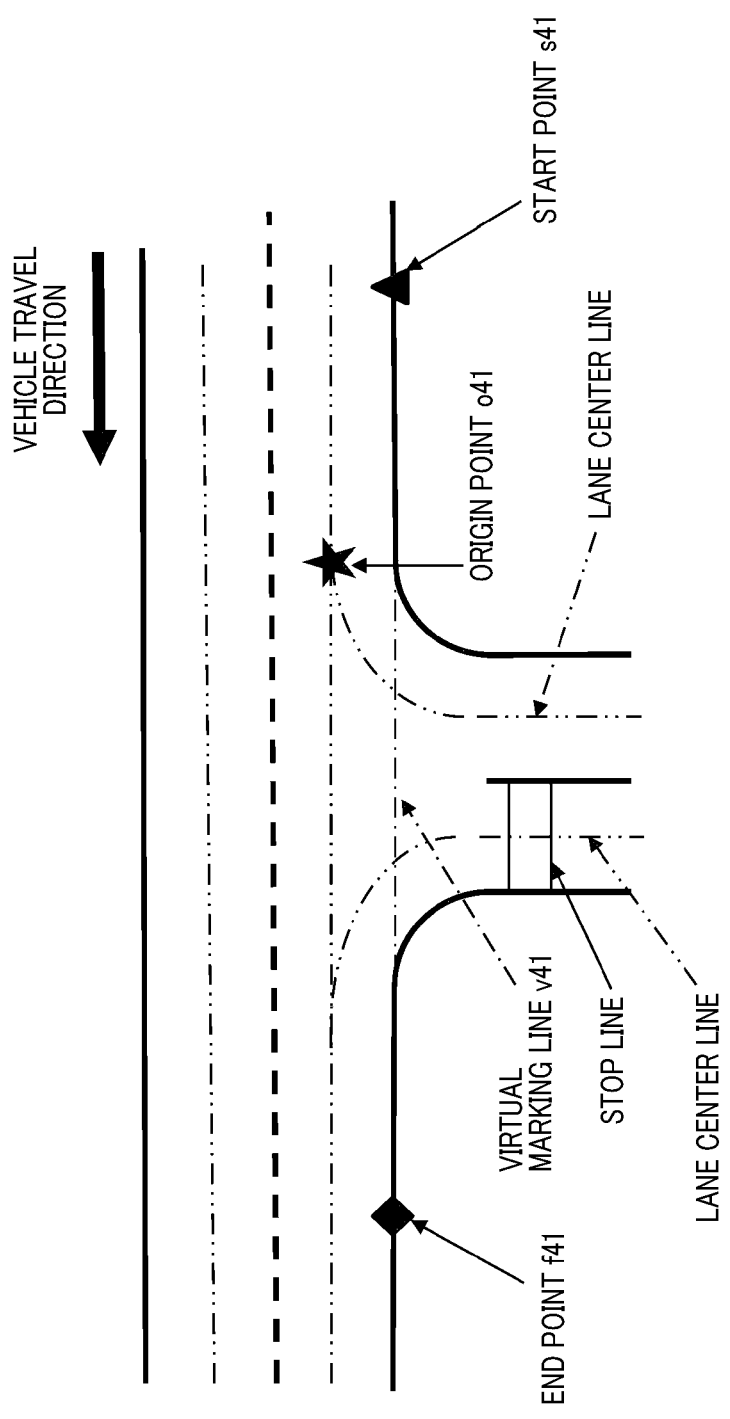
FIG. 23 is a diagram (No. 5) showing a virtual marking line.
Figure 24:
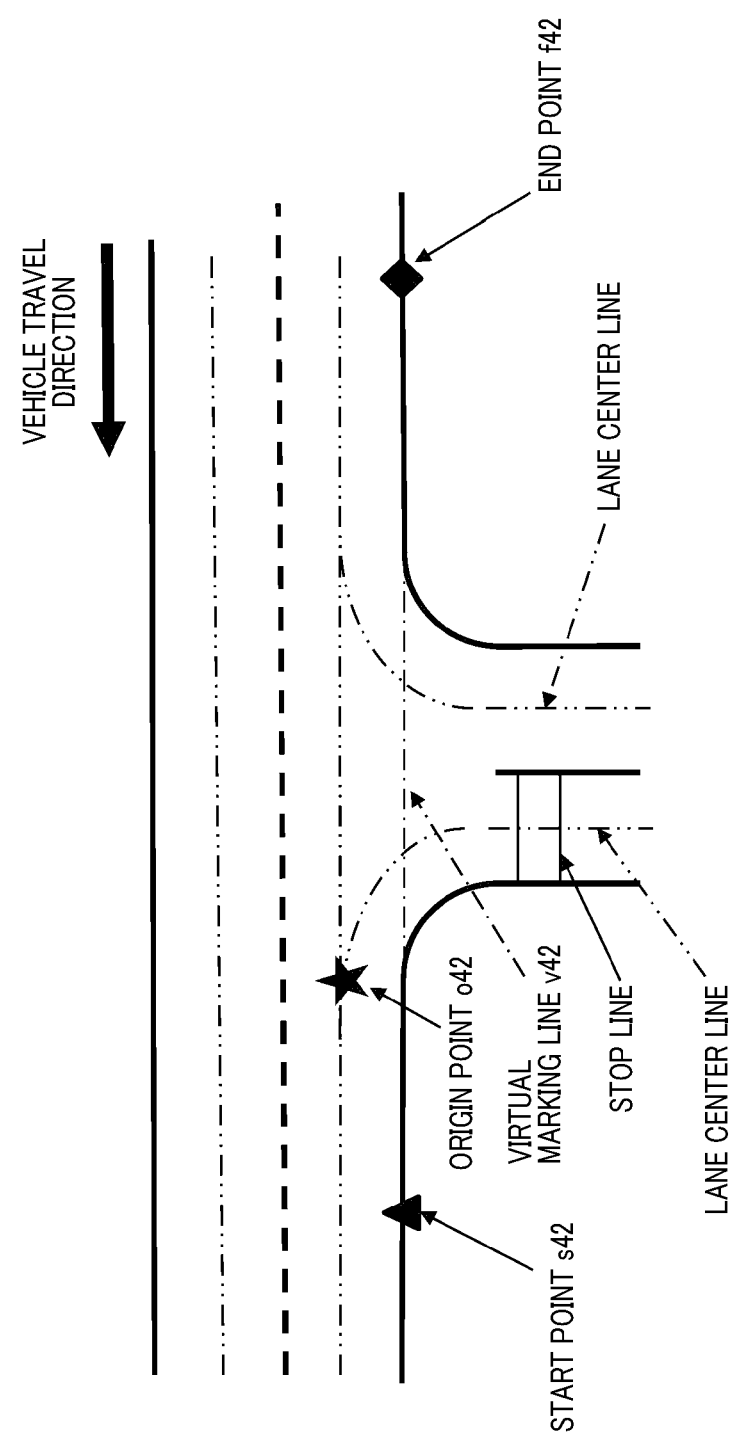
FIG. 24 is a diagram (No. 6) showing a virtual marking line.

As shown in FIGS. 23 and 24, in a T-junction where there is both a branch point and a merge point, the control unit 9 may set an origin point at either the branch point or the merge point. If an origin point o41 is set at the branch point, the control unit 9 generates a virtual marking lane v41 by setting a start point s41 and an end point f41 based on the origin point o41. If an origin point o42 is set at the merge point, the control unit 9 generates a virtual marking lane v42 by setting a start point s42 and an end point f42 based on the origin point o42, as shown in FIG. 24.

Figure 25:
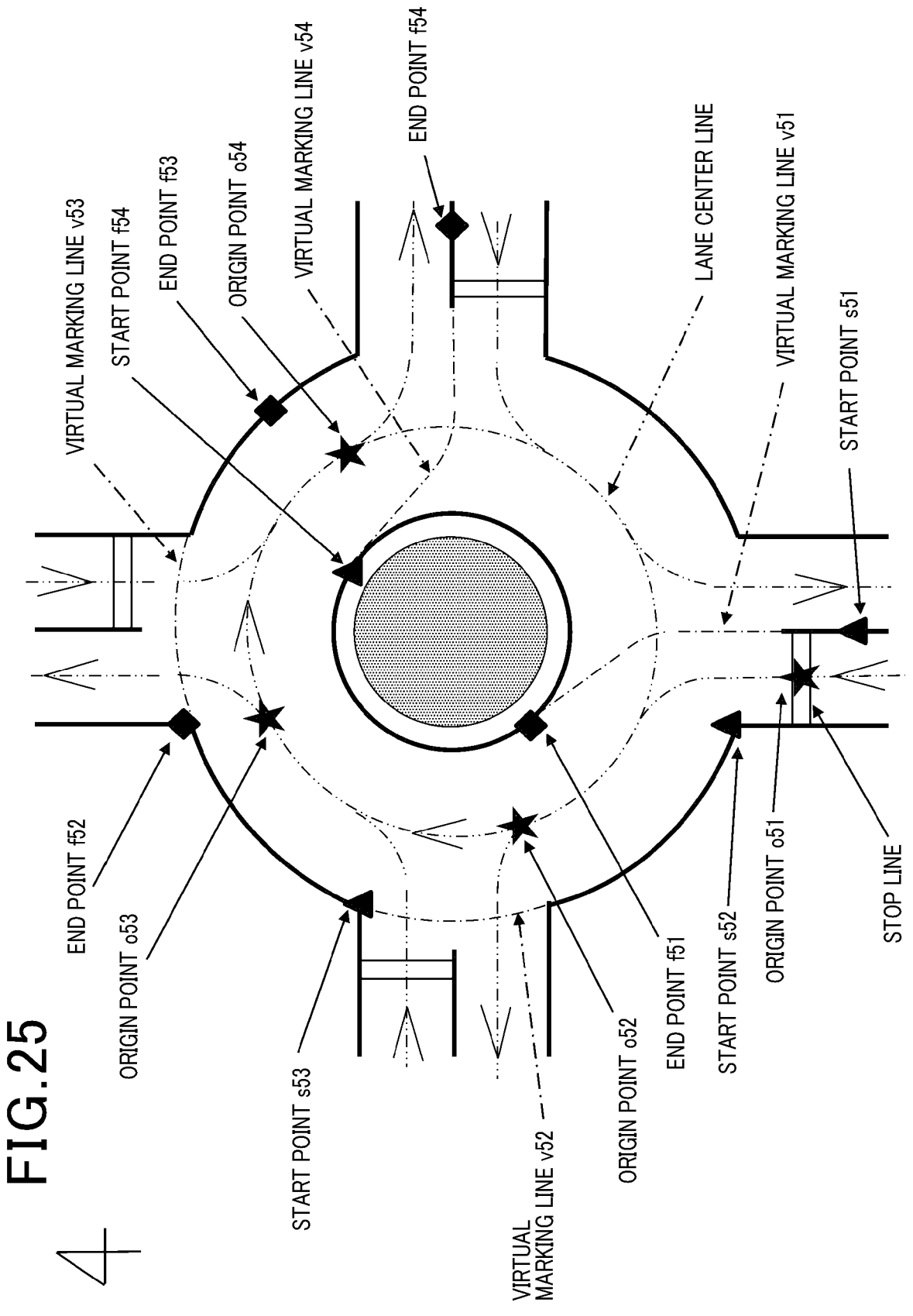
FIG. 25 is a diagram (No. 7) showing virtual marking lines.

At a roundabout traffic intersection, as shown in FIG. 25, the control unit 9 sets the origin point o51 by applying the pattern for a traffic intersection as described above, sets the origin points o52 and o53 by applying the pattern for a location that contains a position where a marking line is interrupted, and sets the origin point o54 by applying the pattern for a location that contains a branch point. The control unit 9 then generates the virtual marking lines v51 to v54, by setting the start points s51 to s54 and end points f51 to f54 based on the origin points o51 to o54. The example of FIG. 25 has been described for the case in which a driver enters the traffic intersection from the south direction and exits in the west, north, or east direction, but is equally applicable to the cases of entering the traffic intersection from the west, north, or east direction.

According to this embodiment, as described above, the following effects can be obtained.

In a location where a virtual marking line is to be generated, the server 3 sets an origin point on the lane center line and sets a start point and an end point on a marking line. The virtual marking line is generated such as to connect the start point and the end point, while overlapping the marking line at both the start point side and the end point side, and the marking line and the virtual marking line are connected. By thus providing sections in which a virtual marking line and a marking line overlap one another, it is made possible to generate map data having attributes of both virtual marking lines and real-world marking lines in the vicinity of the overlapping sections, as opposed to prior art methods in which a virtual marking line is generated only by connecting between respective ends of marking lines. As a result, it is possible with this embodiment to appropriately generate map data having attributes that enable both travel trajectory calculation and own vehicle position judgement to be performed. That is to say, the position of the own vehicle can be accurately specified based on the real-world marking lines, and the travel trajectory can be accurately calculated based on the virtual marking lines. Hence, secure vehicle control can be ensured, by accurately identifying the position of the own vehicle and calculating the travel trajectory of the vehicle.

By setting the interior of a traffic intersection as a target location for generating virtual marking lines, it is possible to ensure safe and secure vehicle control inside the traffic intersection. By setting lane branch points and lane merge points as target locations for generating virtual marking lines, safe and secure vehicle control can be ensured at these lane branch points and lane merge points. By setting locations where marking lines are interrupted as target locations for generating virtual marking lines, safe and secure vehicle control can be ensured where the marking lines are interrupted.

If a plurality of virtual marking lines are generated for one marking line, the plurality of virtual marking lines are integrated to generate a single virtual marking line. It is thereby made possible to prevent vehicle control from becoming unstable due to the presence of a plurality of virtual marking lines for one marking line, and to ensure stable vehicle control.

Smoothing processing is executed on sections which connect between marking lines and virtual marking lines. Smooth vehicle control can thereby be ensured in these connecting sections between the marking line and the virtual marking line.

Although the present disclosure has been described with reference to examples, it is to be understood that the disclosure is not limited to these examples or structures. The scope of the present disclosure also extends to various modifications of these, and to modifications that are within an equivalent range. In addition, various combinations and configurations of these, as well as other combinations and configurations that include only one additional element, two or more additional elements, or a portion of one additional element, fall within the scope and spirit of this disclosure.

Although the described examples are specifically directed to countries and regions in which the traffic regulations stipulate that vehicles drive on the left side, the disclosure is equally applicable to countries and regions in which the traffic regulations stipulate that vehicles drive on the right side.

When a plurality of virtual marking lines are generated in the virtual lane generation process, and are to be integrated to generate a single virtual marking line, then for example, if three virtual marking lines v1$a$, v1$b$ and v1$c$ are generated and are to be used as a virtual marking line v1 that connects a start point s1 and an end point f1, then the three virtual marking lines v1$a$, v1$b$, v1$c$ may be collectively averaged to generate the virtual marking line v1. Alternatively, the two virtual marking lines v1$a$, v1$b$ may be averaged to generate a virtual marking line v1$ab$, and the generated virtual marking lines v1$ab$ and v1$c$ may then be averaged to generate the virtual marking line v1. That is, the averaging of pairs of virtual marking lines may be repetitively executed, to finally generate a single virtual marking line.

The control unit and the techniques thereof described in this disclosure may be implemented by a dedicated computer provided by configuring a processor and memory programmed to perform one or more functions embodied by a computer program. Alternatively, the controller and techniques described in this disclosure may be implemented by a dedicated computer provided by configuring a processor with one or more dedicated hardware logic circuits. Alternatively, the controller and techniques thereof described in this disclosure may be implemented by one or more dedicated computers configured by a combination of a processor and memory programmed to perform one or more functions embodied by a computer program and by a processor configured with one or more hardware logic circuits. The computer program may be stored as computer-executable instructions on a computer-readable non-transitory tangible storage medium.

What is claimed is:

1. A map generating device for generating a virtual marking line in map data, the map generating device in communication with a control unit of a vehicle-mounted device of a vehicle having an automatic driving function or a vehicle not having automatic driving function, the map generating device comprising:

a processor;

a non-transitory computer-readable storage medium; and a set of computer-executable instructions stored on the non-transitory computer-readable storage medium that cause the processor to:

set, as a target location for generating the virtual marking line in the map data, a region in which (I) there exists a vehicle center line based on a vehicle travel trajectory and (II) part of a marking line does not exist;

set an origin point on a lane center line, in the target location for generating the virtual marking line;

set a start point on a first marking line that is parallel to the lane center line on which the origin point is set, with the start point being set in either a forward position or a rearward position relative to the origin point, with respect to a travel direction of the vehicle, wherein the start point is positioned on the first marking line at a distance from an end of the first marking line;

set an end point on a second marking line that is parallel to the lane center line on which the origin point is set, with the end point being set in the other one of the forward position and rearward position relative to the origin point, with respect to the travel direction of the vehicle, wherein the end point is positioned on the second marking line at a distance from an end of the second marking line;

generate a virtual marking line by connecting the start point and the end point such that the virtual marking line overlaps the first marking line and the second marking line on both a start point side and on an end point side; and connect the first marking line and the second marking line with the virtual marking line in the map data, wherein the map data is used by the vehicle having an automatic driving function to navigate the region.

2. The map generation device according to claim 1, wherein the set of computer-executable instructions further cause the processor to set, in response to the target location for generating a virtual marking line being within a traffic intersection, and a stop line being present in the traffic intersection, the origin point at a point of intersection between the lane center line and the stop line.

3. The map generation device according to claim 2, wherein the set of computer-executable instructions further cause the processor to:

with reference to the origin point, set the start point at a position separated by a first predetermined distance from the origin point, in a direction in which a plurality of lane center lines change to a single lane center line, and with reference to the origin point, set the end point at a position separated from the origin point by a second predetermined distance, in a direction in which a single lane center line changes to a plurality of lane center lines.

4. The map generation device according to claim 1, wherein the set of computer-executable instructions further cause the processor to set, in response to the target location for generating a virtual marking line being within a traffic intersection, and a pedestrian crosswalk being present in the traffic intersection, the origin point at the point of intersection between the lane center line and the pedestrian crosswalk.

5. The map generation device according to claim 1, wherein the set of computer-executable instructions further cause the processor to set, in response to the target location for generating a virtual marking line including a branch point or a merge point of traffic lanes, the origin point on the lane center line at the branch point or the merge point.

6. The map generation device according to claim 1, wherein the set of computer-executable instructions further cause the processor to set, in response to the target location for generating a virtual marking line containing a point where a marking line is interrupted on one side or both sides of a lane, the origin point on the lane center line at a position that corresponds, in a lane width direction, to the point where the marking line is interrupted.

7. The map generation device according to claim 6, wherein the set of computer-executable instructions further cause the processor to:

with reference to the origin point, set the start point at a position separated from the origin point by a first predetermined distance, in a direction in which marking lines exist on both sides of the lane center line, and with reference to the origin point, set the end point at a position separated by a second predetermined distance from an appearance point at which marking lines appear on both sides of the lane center line, where the second predetermined distance is in a direction opposite to a direction in which marking lines exist on both sides of the lane center line.

8. The map generating device according to claim 1, wherein the set of computer-executable instructions further cause the processor to integrate, in response to a plurality of virtual marking lines being generated for one marking line, the plurality of virtual marking lines to generate a single virtual marking line.

9. The map generation device according to claim 1, wherein the set of computer-executable instructions further cause the processor to perform smoothing processing on connecting sections between the marking line and the virtual marking line.

10. The map generating device according to claim 1, wherein the set of computer-executable instructions further cause the processor to distribute the map data reflecting the virtual marking line to a vehicle-mounted device.

11. A map generation method for generating a virtual marking line in map data, the map generation method implemented by a control unit of a map generating device, the map generating device in communication with a control unit of a vehicle-mounted device of a vehicle having an automatic driving function or a vehicle not having automatic driving function, the map generation method comprising:

setting, as a target location for generating the virtual marking line in the map data, a region in which (I) there exists a vehicle center line based on a vehicle travel trajectory and (II) part of a marking line does not exist;

setting an origin point on a lane center line, in the target location for generating the virtual marking line;

setting a start point on a first marking line that is parallel to the lane center line on which the origin point is set, with the start point being set in either a forward position or a rearward position relative to the origin point, with respect to a travel direction of the vehicle, wherein the start point is positioned on the first marking line at a distance from an end of the first marking line;

setting an end point on a second marking line that is parallel to the lane center line on which the origin point is set, with the end point being set in the other one of the forward position and rearward position relative to the origin point, with respect to the travel direction of the vehicle, wherein the end point is positioned on the second marking line at a distance from an end of the second marking line;

generating a virtual marking line by connecting the start point and the end point such that the virtual marking line overlaps the first marking line and the second marking line on both a start point side and an end point side; and connecting the first marking line and the second marking line with the virtual marking line in the map data, wherein the map data is used by the vehicle having an automatic driving function to navigate the region.

12. A non-transitory computer-readable storage medium storing a computer program product for generating a virtual marking line in map data, the computer program product implemented by a control unit of a map generating device, the map generating device in communication with a control unit of a vehicle-mounted device of a vehicle having an automatic driving function or a vehicle not having automatic driving function, the computer program product comprising instructions configured to, when executed by at least one processor, cause the at least one processor to generate the map data by:

setting, as a target location for generating the virtual marking line in the map data, a region in which (I) there exists a vehicle center line based on a vehicle travel trajectory and (II) part of a marking line does not exist;

setting an origin point on a lane center line, in the target location for generating the virtual marking line;

setting a start point on a first marking line that is parallel to the lane center line on which the origin point is set, with the start point being set in either a forward position or a rearward position relative to the origin point, with respect to a travel direction of the vehicle, wherein the start point is positioned on the first marking line at a distance from an end of the first marking line;

setting an end point on a second marking line that is parallel to the lane center line on which the origin point is set, with the end point being set in the other one of the forward position and rearward position relative to the origin point, with respect to the travel direction of the vehicle, wherein the end point is positioned on the second marking line at a distance from an end of the second marking line;

generating a virtual marking line by connecting the start point and the end point such that the virtual marking line overlaps the first marking line and the second marking line on both a start point side and an end point side; and connecting the first marking line and the second marking line with the virtual marking line in the map data, wherein the map data is used by the vehicle having an automatic driving function to navigate the region.

* * * * *